(12) United States Patent
Mao

(10) Patent No.: US 11,146,199 B2
(45) Date of Patent: Oct. 12, 2021

(54) MULTI-PHASE MOTOR SYSTEM AND CONTROL METHOD

(71) Applicant: Quanten Technologies, Inc., Allen, TX (US)

(72) Inventor: Hengchun Mao, Allen, TX (US)

(73) Assignee: Quanten Technologies, Inc., Allen, TX (US)

( * ) Notice: Subject to any disclaimer, the term of this patent is extended or adjusted under 35 U.S.C. 154(b) by 53 days.

(21) Appl. No.: 16/414,807

(22) Filed: May 17, 2019

(65) Prior Publication Data

US 2019/0363660 A1 Nov. 28, 2019

Related U.S. Application Data

(60) Provisional application No. 62/675,619, filed on May 23, 2018.

(51) Int. Cl.
| | | |
|---|---|---|
| *H02P 25/20* | (2006.01) | |
| *H02P 27/12* | (2006.01) | |
| *H02P 21/22* | (2016.01) | |

(52) U.S. Cl.
CPC .............. *H02P 25/20* (2013.01); *H02P 21/22* (2016.02); *H02P 27/12* (2013.01); *H02P 2201/03* (2013.01)

(58) Field of Classification Search
CPC .......... H02P 25/098; H02P 6/10; H02P 25/20; H02P 27/12; H02P 21/22; H02P 2201/03; H02P 25/22; H02M 2003/1586
See application file for complete search history.

(56) References Cited

U.S. PATENT DOCUMENTS

| | | |
|---|---|---|
| 2007/0262758 A1 | 11/2007 | Wildash |
| 2011/0031838 A1 | 2/2011 | Serra et al. |
| 2013/0050888 A1 | 2/2013 | Asplund et al. |
| 2014/0265994 A1 | 9/2014 | Mao |
| 2014/0307481 A1 * | 10/2014 | Wang .................... H02M 3/285 363/17 |
| 2016/0004810 A1 | 1/2016 | Solodovnik et al. |
| 2016/0329832 A1 * | 11/2016 | Aeloiza ................. H02M 1/12 |
| 2018/0034401 A1 * | 2/2018 | Mao ........................ H02K 3/28 |
| 2019/0184833 A1 * | 6/2019 | Elshaer ................ B60L 3/0069 |

\* cited by examiner

*Primary Examiner* — Bickey Dhakal
(74) *Attorney, Agent, or Firm* — Slater Matsil, LLP

(57) ABSTRACT

A motor control method includes providing a motor comprising a plurality of windings, a rotor and a stator magnetically coupled to the rotor, coupling a plurality of power converters to the plurality of windings, configuring the plurality of power converters to operate in a first interleaving mode, controlling the plurality of power converters to dynamically adjust the number of poles of the motor and after the step of controlling the plurality of power converters to dynamically adjust the number of poles of the motor, configuring the plurality of power converters to leave the first interleaving mode and enter into a second interleaving mode.

20 Claims, 17 Drawing Sheets

MULTI-PHASE MOTOR SYSTEM AND CONTROL METHOD

This application claims the benefit of U.S. Provisional Application No. 62/675,619, filed on May 23, 2018, entitled "Cost-effective Multi-phase Motor and Generator Systems," which application is hereby incorporated herein by reference.

TECHNICAL FIELD

The present disclosure relates to a motor and/or generator system, and, in particular embodiments, to innovative technologies which improve the design, construction and control of advanced motors/generators and drive systems.

BACKGROUND

An electric machine (motor or generator) is an apparatus converting energy between electric power and mechanical rotary motion. There are different types of electric machines including induction machines, permanent magnets machines, switching reluctance machines, synchronous reluctance machines and hybrid machines. The various embodiments in this disclosure are applicable to the different types of electric machines above, which are configured as either motors or generators. Induction motors as an example are used to illustrate the innovative aspects of the present disclosure. The induction motor comprises a stator and a rotor. The stator is the stationary part and the rotor is the rotating part. The rotor may be inside the stator, outside the stator or beside the stator as in an axial field machine. An induction motor having a rotor inside a stator is used as an example to illustrate the innovative aspects of the present disclosure. A small motor air gap exists between the rotor and the stator for mechanical clearance and mechanical torque generation.

The squirrel cage inductor motor is the most common electric machine. The stator of the squirrel cage inductor motor comprises a plurality of windings. The plurality of windings usually forms a plurality of phase belt arranged in pole pairs. The rotor of the squirrel cage induction motor comprises a shaft and a squirrel cage made of metal bars contained in a magnetic structure such as a laminated silicon steel stack. The shaft is surrounded by the metal bars. First ends of the metal bars are connected by a first interconnect ring. Second ends of the metal bars are connected by a second interconnect ring.

In operation, the electric power is usually applied to the stator. As a result, a first magnetic field is created in the stator and in the air gap. The first magnetic field rotates in time at a synchronous speed with alternating current (ac) power applied to the stator windings. The first magnetic field induces electric currents in the metal bars of the rotor. The induced currents produce a second magnetic field in the rotor. The second magnetic field of the rotor reacts against the first magnetic field of the stator. According to Lenz's Law, the rotor follows the rotating first magnetic field and generates a mechanical torque pulling the rotor into rotation. In a motor mode, the rotor will fall behind the first magnetic field. The speed difference between the first magnetic field and the rotor keeps inducing electric currents inside the rotor. If a load is applied to the rotor and the rotor falls further behind the first magnetic field, more torque will developed due to the lag between the rotor and the first magnetic field. In other words, the torque of the motor is approximately proportional to the slip between the speed of the rotor and the speed of the first magnetic field.

The theoretical speed of the induction motor traditionally depends on frequency of the electric power supply and the arrangement of poles in the stator coils. With no load on the motor, the speed of the rotor is equal to or approximately equal to the synchronous speed of the rotating magnetic field. The synchronous speed of an inductor motor is determined by the frequency of the electric power supply and the number of poles of the inductor motor. In particular, the synchronous speed of the induction motor is equal to the frequency of the electric power supply times 60 and further divided by the number of pole pairs in revolutions per minute (rpm).

As energy efficiency becomes an increasingly important issue, more motors and generators are coupled to power electronics equipment in variable speed applications, such as industrial drives, electrical vehicles, diesel-generator sets, servo systems, and wind power generation. Many of these applications require the motors and generators to operate over a wide speed and power range, and traditional technologies cannot satisfy the performance and cost requirements for such applications. There may be a need for having a motor operating efficiently over a wide speed and power range. It has been proposed to dynamically adjust the number of poles and/or the number of phases of the motor to provide more freedom to optimize the performance of the motor, especially to improve the efficiency of the motor and the drive system. The number of poles in a machine, and/or the number of phases in a pair of poles may be changed by controlling the currents in the windings, particularly by changing the phase relationship between currents in adjacent windings. However, how to implement such a system cost-effectively has remained a significant challenge. Particularly, such a system having a power delivery subsystem including protective devices and a dc link filtering capacitor may have significant power losses and be difficult to manufacture if not designed properly, and the need of having a large number of current sensing devices may also lead to a cost increase.

It would be desirable to have a high performance motor system with advanced control techniques exhibiting good behaviors such as high efficiency over a variety of speed and power range conditions at a low cost.

SUMMARY

These and other problems are generally solved or circumvented, and technical advantages are generally achieved, by preferred embodiments of the present disclosure which provide a cost-effective implementation of a multi-phase motor system capable of dynamically adjusting the number of poles and/or phases.

In accordance with an embodiment, a method comprises providing a motor comprising a plurality of windings, a rotor and a stator magnetically coupled to the rotor, coupling a plurality of power converters to the plurality of windings, configuring the plurality of power converters to operate in a first interleaving mode, controlling the plurality of power converters to dynamically adjust the number of poles of the motor and after the step of controlling the plurality of power converters to dynamically adjust the number of poles of the motor, configuring the plurality of power converters to leave the first interleaving mode and enter into a second interleaving mode. In another embodiment, a method comprises providing a motor comprising a plurality of windings, a rotor and a stator magnetically coupled to the rotor, coupling a plurality of power converters between a power source and the plurality of windings through a dc link, dividing the plurality of power converters into a plurality of groups, wherein a first group of power converters are synchronized to a first synchronization signal, and a second group of power converters are synchronized to a second synchronization signal, and wherein the first synchronization signal and second synchronization signal are interleaved with a interleave angle and configuring the plurality of power converters to operate in a first interleaving mode during a first operation mode and operate in a second interleaving mode during a second operation mode, wherein the interleave angle in the first interleaving mode is different from the interleave angle in the second interleaving mode.

In accordance with another embodiment, a system comprises a motor having a plurality of windings, a rotor and a stator magnetically coupled to the rotor, wherein the plurality of windings is configured such that the number of poles of the motor can be dynamically adjustable by adjusting currents flowing through the plurality of windings, a plurality of power converters connected to respective windings, wherein the plurality of power converters and the plurality of windings are arranged into a plurality of symmetric groups and a plurality of current sense devices configured to detect currents flowing through sensed windings of the motor, wherein the number of the plurality of windings is significantly greater than the number of the current sense devices through which the currents of the plurality of windings are estimated or observed.

In accordance with yet another embodiment, an apparatus comprises a bus bar coupled between a power source and a power converter, wherein the power converter is configured to drive a motor comprising a plurality of windings, a rotor, a stator magnetically coupled to the rotor, and wherein the bus bar comprises a first plane connected to a first terminal of the power source, a second plane connected to a first terminal of the power converter, a third plane coupled between a second terminal of the power source and a second terminal of the power converter, a protective device connected between the first plane and the second plane and a low impedance path coupled between the third place and a point adjacent to a joint point of the protective device and the first or second plane.

An advantage of an embodiment of the present disclosure is a cost-effective device and method for a reconfigurable motor system capable of dynamically adjusting the number of poles and/or phases.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a cost-effective apparatus and method for a reconfigurable motor system. There are different types of electric machines including induction machines, permanent magnets machines, switching reluctance machines, synchronous reluctance machines, and hybrid machines. The various embodiments in this disclosure are applicable to the electric machines above. The disclosure may also be applied, however, to a variety of electric machines and machine systems. Hereinafter, various embodiments will be explained in detail with reference to the accompanying drawings.

Figure 1:
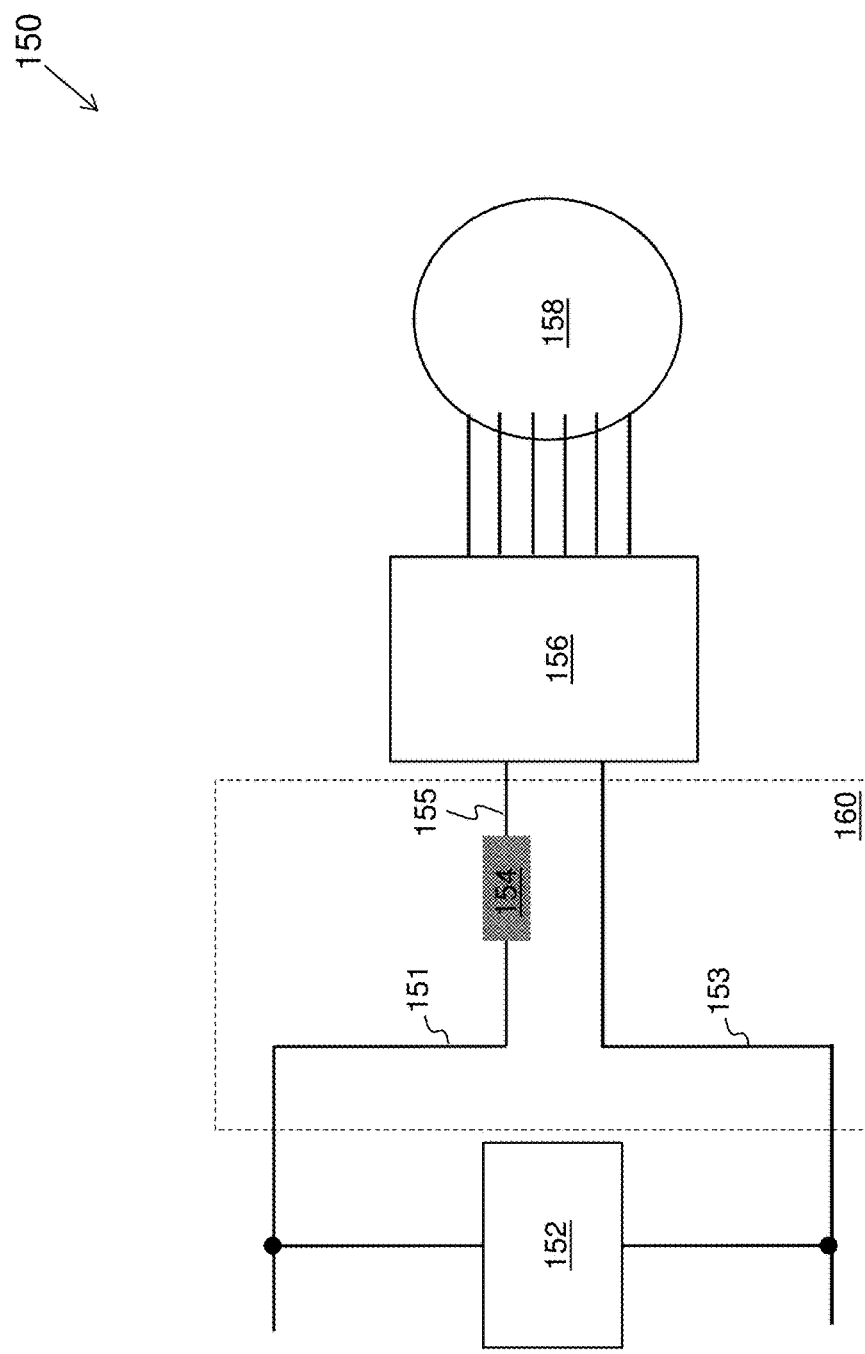
FIG. 1 illustrates a block diagram of a motor drive system having a power delivery system comprising a bus bar in accordance with various embodiments of the present disclosure.

FIG. 1 illustrates a block diagram of a motor drive system having a power delivery system comprising a bus bar in accordance with various embodiments of the present disclosure. The motor drive system 150 includes a power source 152, a bus bar 160, a power converter 156 and a motor apparatus 158. As shown in FIG. 1, the power source 152 is connected to the inputs of the power converter 156 through the bus bar 160. The outputs of the power converter 156 are electrically coupled to the motor apparatus 158.

In some embodiments, the power source 152 is implemented as a low voltage power system such as a 48 V battery or a 12 V battery. The power converter 156 is a dc/ac converter. The dc/ac converter is employed to convert the dc voltage from the dc power source into ac voltages suitable for driving the motor apparatus 158. The motor apparatus 158 may be implemented as an integrated starter/generator (ISG). The ISG can be implemented with different ways, most commonly as BSG or belt-integrated starter/generator. In some embodiments, the motor apparatus 158 comprises a plurality of windings, a rotor and a stator magnetically coupled to the rotor.

In some embodiments, because the power source may have a low voltage, the bus bar 160 is employed to conduct a high current flowing between the power source 152 (e.g., a battery) and the dc/ac converter. It is also advantageous to reduce the impedance of the bus bar and any ripple current conducted by the bus bar to reduce the disturbance to the system. The bus bar 160 comprises a first portion 151, a second portion 153 and a third portion 155. A protective apparatus 154 is connected between the first portion 151 and the third portion 155. In some embodiments, the protective apparatus 154 may be implemented as a fuse. Throughout the description, the protective apparatus 154 may be alternatively referred to as a fuse apparatus. As shown in FIG. 1, the first portion 151, the protective apparatus 154 and the third portion 155 are connected in cascade between a first terminal of the power source 152 and a first input of the power converter 156. In a preferred embodiment, the first terminal of the power source is the positive terminal of power source 152. In another preferred embodiment, the first terminal of the power source is the negative terminal of power source 152. For brevity of description, the first portion 151, the protective apparatus 154 and the third portion 155 are collectively referred to as a positive lead of the bus bar 160 in the following discussion. Similarly, the second portion 153 is connected between a second terminal of the power source 152 and a second input of the power converter 156. The second portion 153 is alternatively referred to as a negative lead of the bus bar 160 in the following discussion. The detailed implementation of the bus bar 160 will be described below with respect to FIGS. 2-5. It should be noted that the protective apparatus or device may be implemented as a fuse, a switch, a breaker or the like.

It should be noted that the diagram shown in FIG. 1 is merely an example, which should not unduly limit the scope of the claims. One of ordinary skill in the art would recognize many variations, alternatives, and modifications. For example, the protective apparatus 154 may include two portions placed in the positive bus and the negative bus respectively.

Figure 2:
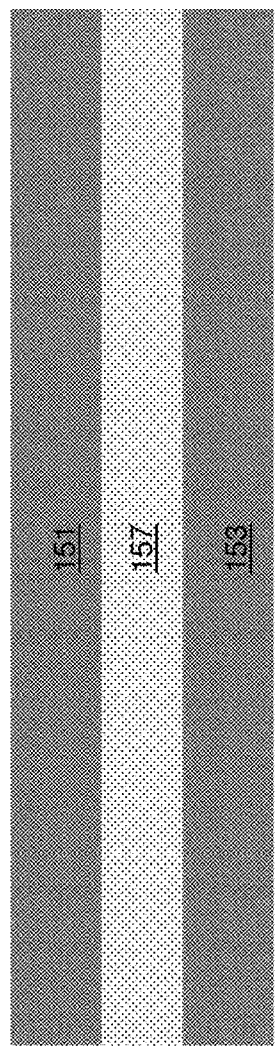
FIG. 2 illustrates a cross sectional view of the bus bar shown in FIG. 1 in accordance with various embodiments of the present disclosure.

FIG. 2 illustrates a cross sectional view of the bus bar shown in FIG. 1 in accordance with various embodiments of the present disclosure. In some embodiments, the first portion 151, the protective apparatus 154 and the third portion 155 of the bus bar 160 are implemented as a first conductive plane (e.g., a metal layer) in a multi-layer structure such as a printed circuit board (PCB) or a bus bar assembly. The second portion 153 of the bus bar 160 is implemented as a second conductive plane (e.g., a metal layer) in the multi-layer structure.

As shown in FIG. 2, the first portion 151 of the bus bar 160 and the second portion 153 of the bus bar 160 are implemented as two conductive planes separated by a dielectric layer 157. In particular, the first portion 151 is on and in contact with a first side of the dielectric layer 157. The second portion 153 is on and in contact with a second side of the dielectric layer. The conductive planes may be formed of suitable metals such as copper, aluminum and the like. The thickness of the conductive planes is in a range from about 0.1 mm to about 2 mm. The dielectric layer 157 provides electrical isolation between the conductive planes, and the dielectric layer 157 may be a thin insulation plate such as a Kapton paper, an isolative tape, a FR 4 material and the like.

Figure 3:
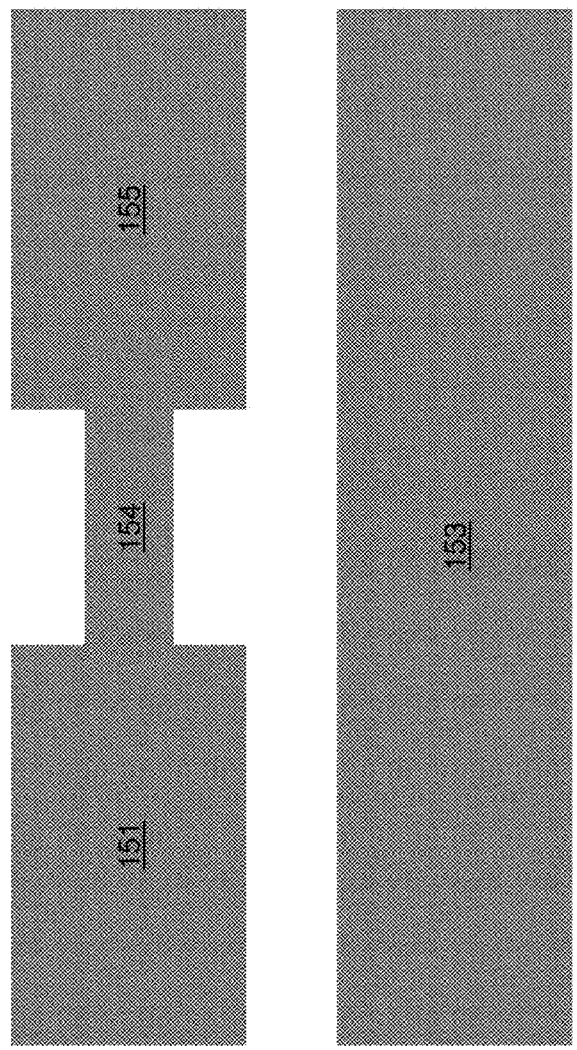
FIG. 3 illustrates a view of the bus bar in accordance with various embodiments of the present disclosure.

FIG. 3 illustrates a view of the bus bar in accordance with various embodiments of the present disclosure. The first portion 151 is a first positive plane. The second portion 153 is a negative plane. The third portion 155 is a second positive plane. The first positive plane, the second positive plane and the negative plane are formed of copper, aluminum or other electrical conductive materials. Throughout the description, they are alternatively referred to as copper planes. As shown in FIG. 3, a width of the first positive plane 151 is substantially equal to a width of the second positive plane 155. A width of the negative plane 153 is substantially equal to a width of the first positive plane 151.

In some embodiments, the protective apparatus 154 is a fuse, and may be implemented as a narrow metal strip connected between the first positive plane 151 and the second positive plane 155. As shown in FIG. 3, the width of the fuse apparatus 154 is significantly narrower than the width of the first positive plane 151. During the process of forming the first positive plane 151 and the second positive plane 155, the fuse apparatus 154 may be cut or stamped from the same metal plane from which the first positive plane 151 and the second positive plane 155 are manufactured.

To reduce the voltage disturbance after the fuse apparatus 154 is blown, a plurality of low impedance paths should be provided for conducting the currents flowing through the bus bar 160. The detailed implementation of the low impedance paths will be described below with respect to FIG. 5.

Figure 4:
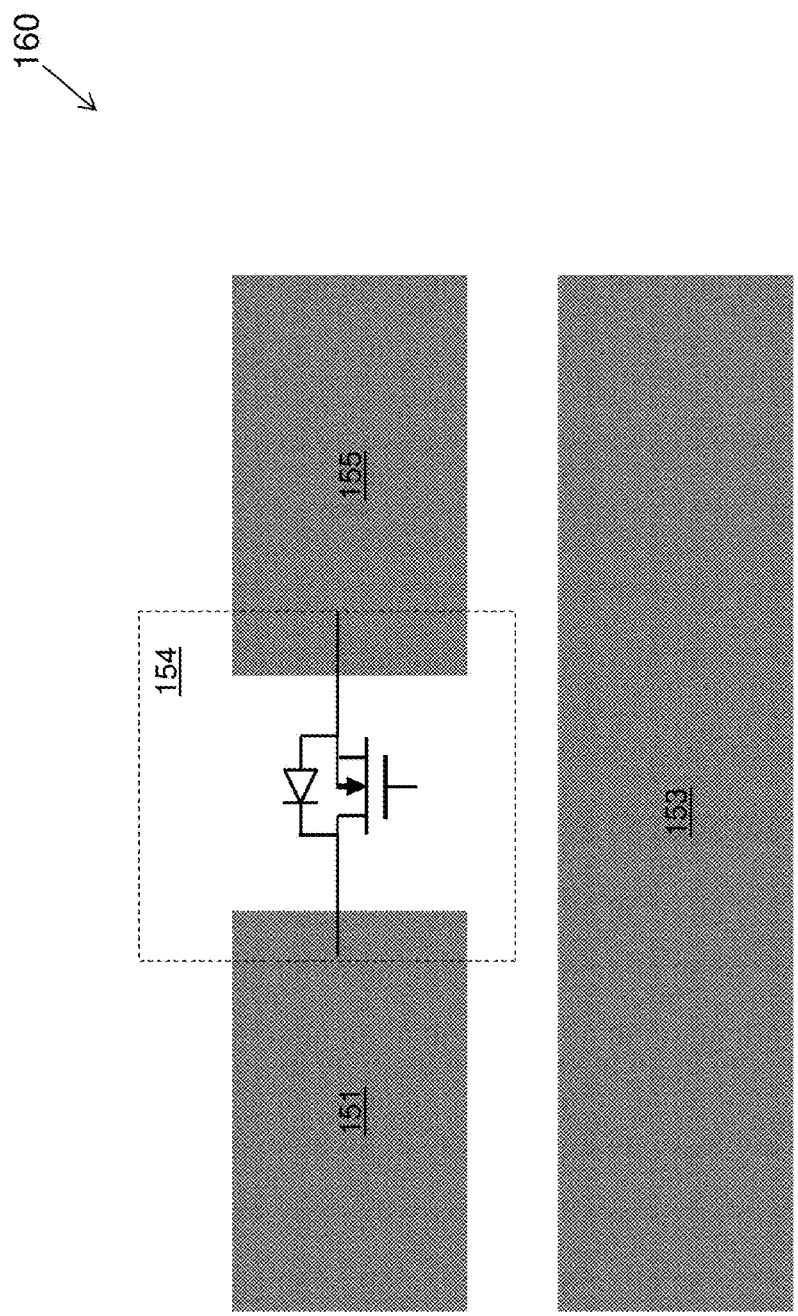
FIG. 4 illustrates a view of another bus bar in accordance with various embodiments of the present disclosure.

FIG. 4 illustrates a view of another bus bar in accordance with various embodiments of the present disclosure. The bus bar shown in FIG. 4 is similar to that shown in FIG. 3 except that the protective apparatus 154 is implemented as a metal-oxide-semiconductor field-effect transistor (MOS- FET). As shown in FIG. 4, the MOSFET has a first drain/source region in contact with the first positive plane 151, and a second drain/source region in contact with the second positive plane 155. In operation, the MOSFET is turned off after the current flowing through the bus bar 160 is greater than a predetermined threshold. The MOSFET, or other switching devices, can be controlled to operate in a similar manner as a fuse or a breaker.

Figure 5:
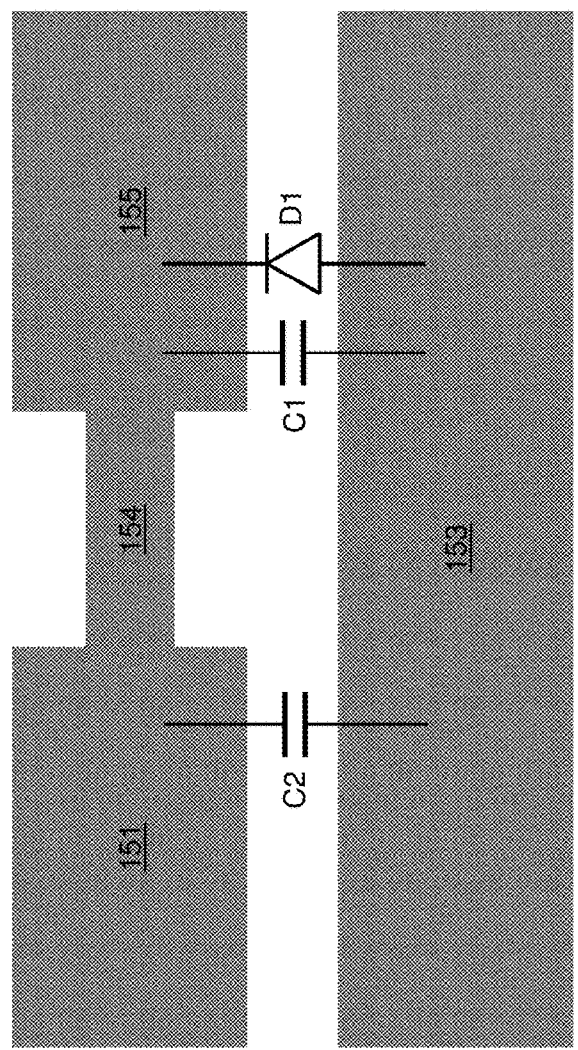
FIG. 5 illustrates a view of yet another bus bar in accordance with various embodiments of the present disclosure.

FIG. 5 illustrates a view of yet another bus bar in accordance with various embodiments of the present disclosure. As shown in FIG. 5, a first capacitor C1 is connected between the second positive plane 155 and the negative plane 153. A diode D1 is connected between the second positive plane 155 and the negative plane 153. The anode of the diode D1 is connected to the negative plane 153. The cathode of the diode D1 is connected to the second positive plane 155. A second capacitor C2 is connected between the first positive plane 151 and the negative plane 153. Please note that C1 and/or C2 may be a discrete capacitor or an integrated capacitor along the bus bar. For example, the integrated capacitor may be implemented by placing an appropriate dielectric material (e.g., layer 157) between the positive plane 151 and/or 155 and the negative plane 153. As a result of placing the appropriate dielectric material, an integrated capacitor with proper capacitance can be formed between a positive plane and a negative plane. The diode D1 is an optional element. Depending on different applications and design needs, the diode D1 may not be included.

As shown in FIG. 5, the first capacitor C1 and the diode D1 are connected to the protective apparatus 154 and they are adjacent to the load side (the power converter 156 shown in FIG. 1). The second capacitor C2 is connected to the fuse apparatus 154 and the second capacitor C2 is adjacent to the source side (the power source 152 shown in FIG. 1).

It should be noted that other components such as transient voltage absorbers may also be used independently or in combination with the components shown in FIG. 5. The protective apparatus 154 and the low-impedance components (e.g., C1, C2 and D1) may be integrated as a subassembly, or be integrated together with the bus bar 160. It should further be noted that the length of the bus bar should also be minimized. For example, in a vehicle having a low voltage battery, the ISG (together with its power converter) may be placed in the engine compartment within a short distance from the battery, or the battery can be placed a place close to the ISG outside the engine compartment. As such, the length of the bus bar 160 can be reduced accordingly.

From FIGS. 6-17, the present disclosure will be described with respect to preferred embodiments in a specific context, namely a dynamically reconfigurable induction motor (DRIM) system/technology for improving the traditional motor technology by dynamically changing the number of poles and/or the number of phases through various power electronics control mechanisms. With the DRIM system/technology, the efficiency and reliability of the system can be significantly increased while the system cost is reduced. It should be noted that the general principles of the innovative aspects in this disclosure may be also applied to electric machines with a fixed number of poles and/or phases.

This disclosure presents further improvements in motor/generator design and manufacturing processes. Although the discussion uses a motor as an example, the same principles can be applicable to generators.

The number of poles and number of phases in a pair of poles in a motor can impact its operation and performance significantly. In traditional motors, the number of poles and the number of phases are determined by the winding construction and connection. In a DRIM motor, the windings are arranged to have open connections. The number of poles (2P) and the number of phases in a pair of poles are determined by the currents flowing through the windings (N), which enables the numbers of P and N to be dynamically changed in real-time operation through controlling the phase relationship of the winding currents. In some embodiments, there may be a plurality of power converters. The plurality of power converters is divided into a plurality of power converter groups. The motor has a plurality of conductors. The plurality of conductors is divided into a plurality of groups of conductors. In some embodiments, the plurality of conductors is divided into the plurality of groups consecutively. In alternative embodiments, the plurality of conductors is divided symmetrically into the plurality of groups of conductors. In some embodiments, the power converters coupled to a group of conductors are configured to control phase relationships of currents flowing through the group of conductors.

This control of the winding currents can be achieved through coupling a plurality of power converters to the windings. A suitable control algorithm is employed to control the operation of the plurality of power converters. As a result, the motor and the associated motor drive system become a software defined system. The operation and performance of the software defined system can be improved over a wide range of operating conditions and with simulated and/or actual operation data through a self-learning and optimizing algorithm with real-time software update capability, thereby resulting in much better performance and cost tradeoffs. The benefits of the software defined system are especially significant for systems with complex operation modes such as electrical vehicles. In addition, the energy efficiency, reliability and cost of the system can be improved simultaneously by applying the DRIM technology to the motor. For example, the system can continue to operate even though some windings in the motor, or some parts in a power converter are failed, as the failed parts or failed windings can be disabled and isolated from the rest of the system, which is still working. It is also feasible to disable some power converters and/or some windings to make the system operate with a reduced number of phases to improve system efficiency at light load. The technique of reducing the number of phases of a motor is similar to the phase-shading technique used in dc-dc converters.

Figure 6:
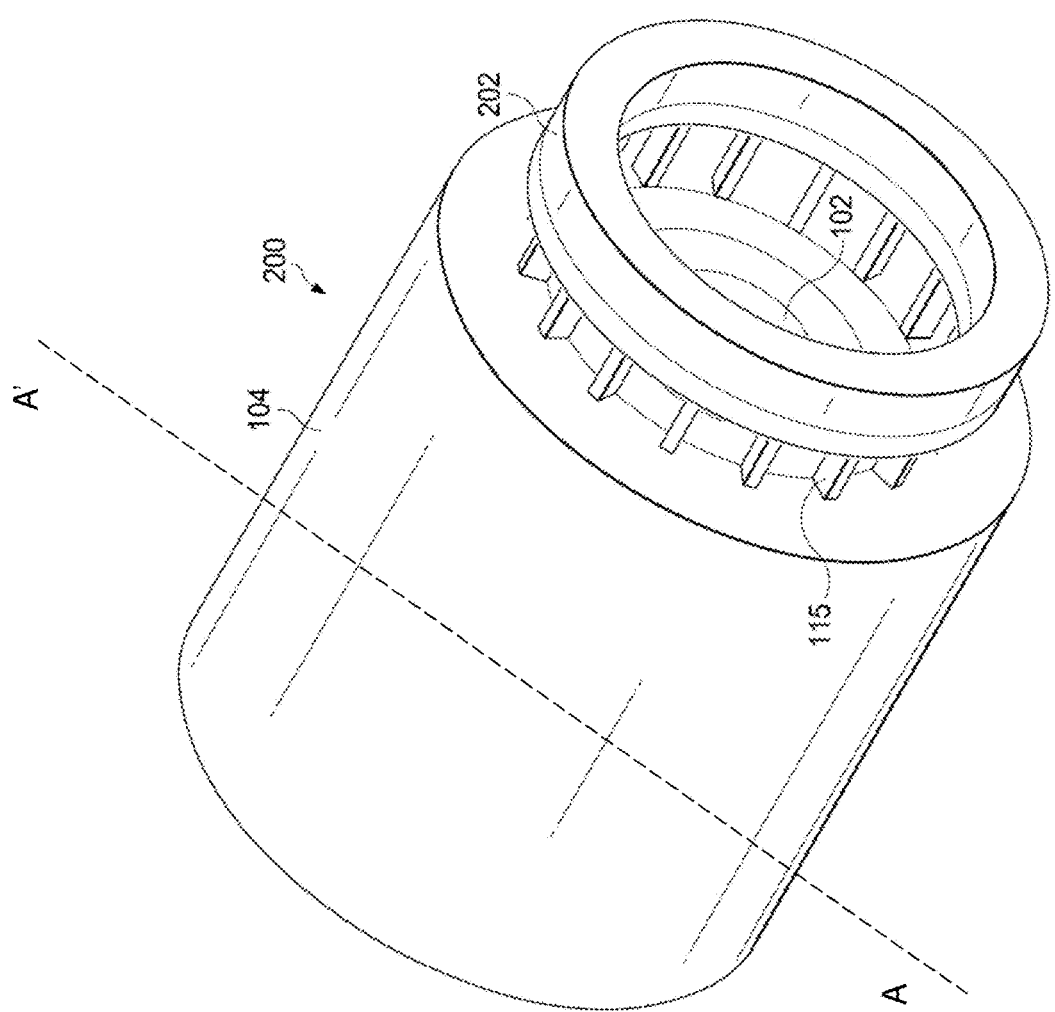
FIG. 6 illustrates a perspective view of a motor system in accordance with various embodiments of the present disclosure.

FIG. 6 illustrates a perspective view of a motor system in accordance with various embodiments of the present disclosure. The motor system 200 comprises a rotor 102 and a stator 104. The rotor 102 is inside and surrounded by the stator 104. The stator 104 comprises a stator core, a plurality of stator windings and a connection ring 202. The plurality of stator windings (e.g., stator winding 115) is embedded in the stator core. The plurality of stator windings is connected together by the connection ring 202 as shown in FIG. 6. The stator core is formed of suitable magnetic materials. The stator core is able to conduct magnetic flux and provide mechanical support for the plurality of stator windings. In this disclosure, the terms of stator winding, phase winding and phase conductor are usually interchangeable and usually have the same meaning. Depending on the construction of the motor, a phase winding or phase conductor may be located in the rotor also, although the following discussion will generally use such windings in the stator as examples. Throughout the description, the motor system shown in FIG. 6 may be alternatively referred to as a reconfigurable motor system.

Figure 7:
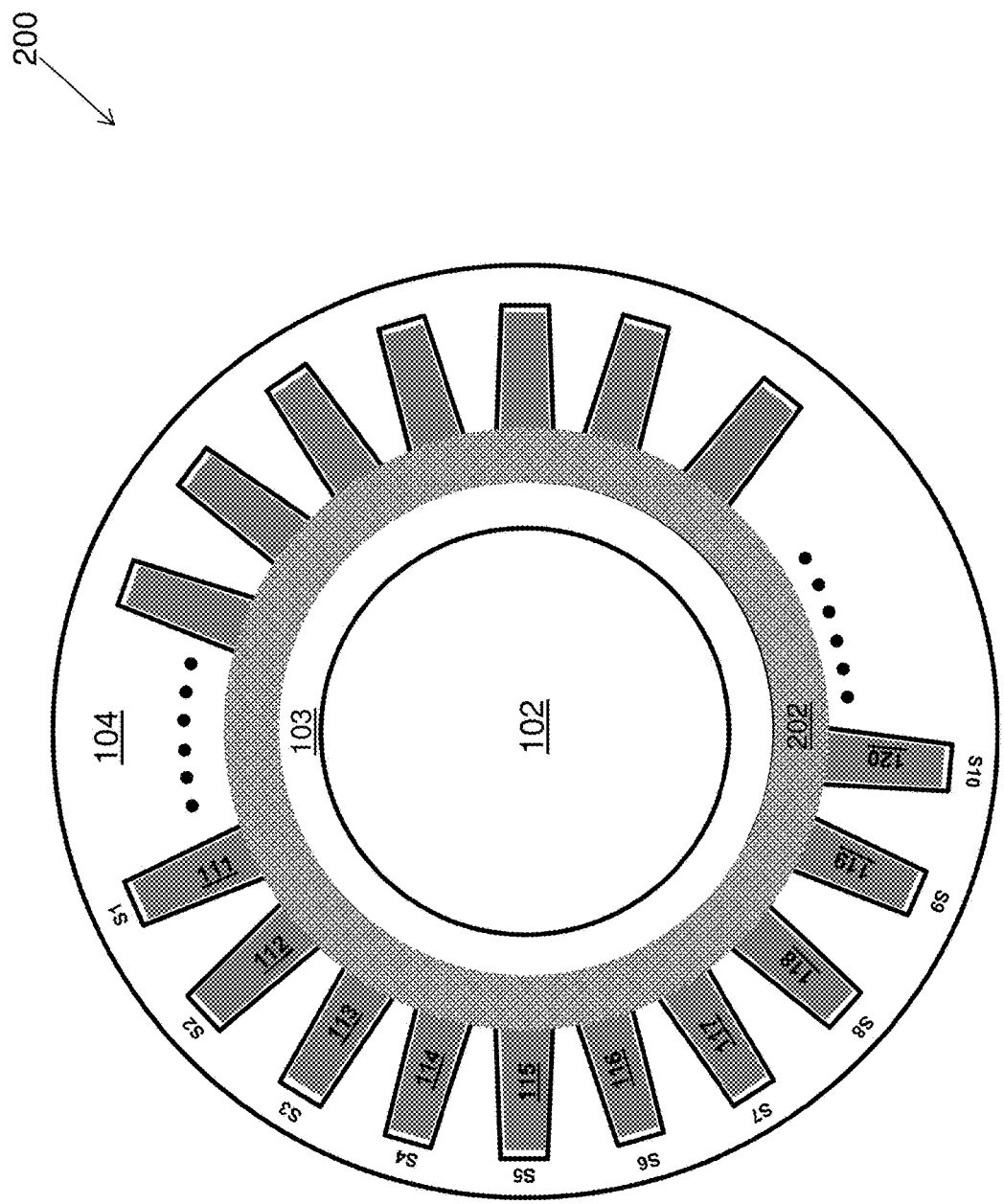
FIG. 7 illustrates a simplified view of the motor system shown in FIG. 6 in accordance with various embodiments of the present disclosure.

FIG. 7 illustrates a simplified view of the motor system shown in FIG. 6 in accordance with various embodiments of the present disclosure. The reconfigurable motor system 200 comprises the rotor 102, the stator 104 and a plurality of phase conductors formed in the stator 104. As shown in FIG. 2, there is an air gap 103 formed between the rotor 102 and the stator 104. A plurality of slots S1-S10 is formed in the stator 104. Each slot (e.g., slot S1) is employed to accommodate one stator winding comprising a phase conductor (e.g., stator winding 111). It should be noted, depending on different designs, more stator windings may be embedded in one slot. As shown in FIG. 7, there may be a plurality of stator windings 111-120 formed in the stator 104. Throughout the description, the stator winding may be alternatively referred to as the phase conductor of the stator.

It should be recognized that while FIG. 7 illustrates the motor system 200 with few slots and stator windings, the motor system 200 could accommodate any number of slots and stator windings. The slots are generally evenly distributed along a perimeter of the motor, and are labeled consecutively. Throughout the description in the present disclosure, a slot and the winding in the slot are generated designated with the same number. For example, S5 shown in FIG. 7 may means the 5th slot or the phase conductor (winding) embedded in the 5th slot, depending on the context of the description.

FIG. 7 further illustrate the connection ring 202. Throughout the description, the connection ring 202 may be alternatively referred to as a ring. As shown in FIG. 7, the ring 202 is placed on one end of the stator 104. The ring 202 is formed of a suitable conductive material. The ring 202 is employed to connect the stator windings together. As shown in FIG. 7, each stator winding has one end connected to the ring 202. The ring 202 allows the currents of all stator windings to be controlled. It should be noted that there may be multiple rings in a system, and a ring may be put on either end of the stator, or multiple rings can be put on both ends of the stator.

It should be noted that the sum of the currents flowing through the stator windings should be equal to zero if the ring 202 is not connected to other nodes of the motor system. If the sum of the currents flowing through the stator windings is not equal to zero, a conductive path should be provided as a return path for the unbalanced currents.

As shown in FIG. 7, the ring 202 is circular in shape. It should further be noted that the shape of the ring 202 is merely an example. One of ordinary skill in the art would recognize many variations, alternatives, and modifications. For example, it is within the scope and spirit of the disclosure for the ring 202 to comprise other shapes, such as, but not limited to oval, square or rectangle, and may not be a closed loop. Throughout the description, the ring may be alternatively referred to as a connection ring or a connection bar.

Figure 8:
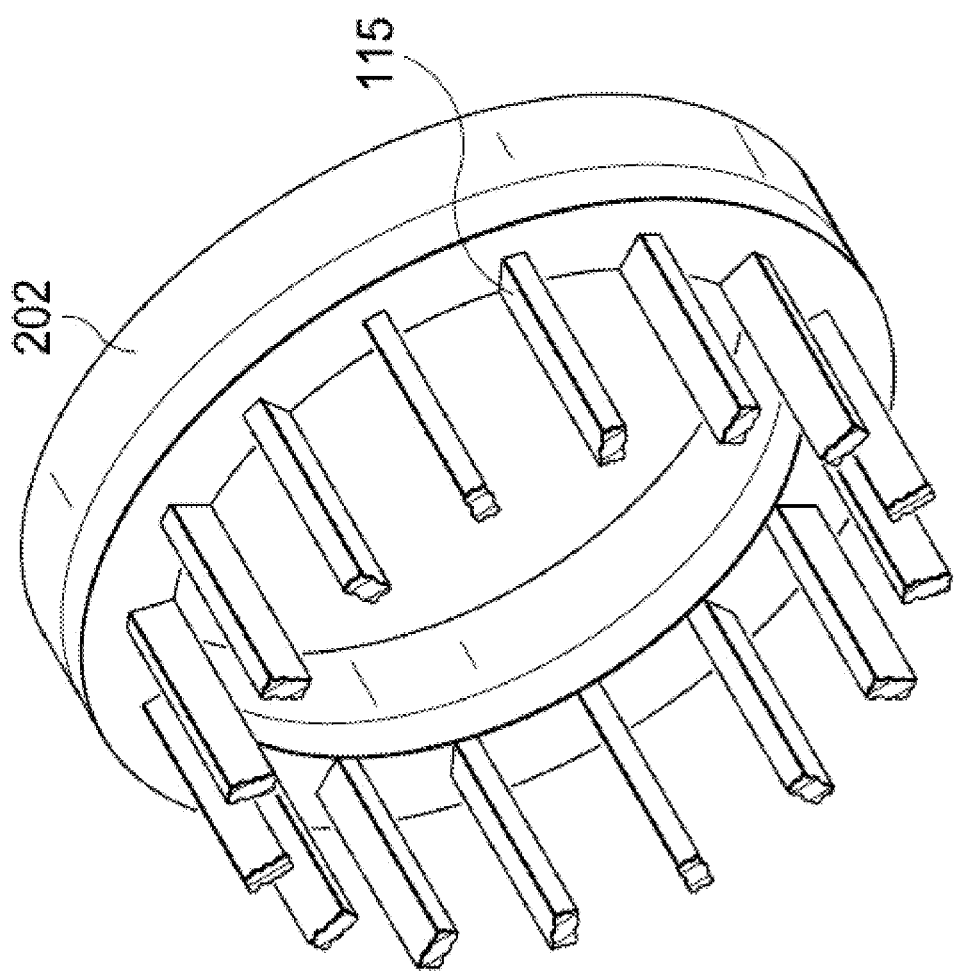
FIG. 8 illustrates a perspective view of the connection ring and the plurality of stator windings of the motor system shown in FIG. 7 in accordance with various embodiments of the present disclosure.

FIG. 8 illustrates a perspective view of the connection ring and the plurality of stator windings of the motor system shown in FIG. 7 in accordance with various embodiments of the present disclosure. The connection ring 202 is circular in shape. One end of each stator winding (e.g., stator winding 115) is connected to the connection ring 202. The connection ring 202 is formed of a conductive material. The plurality of stator windings is electrically connected to each other. In the manufacturing process, a phase conductor may be inserted into a slot of a motor as a component. Alternatively, the phase conductor may be manufactured into the slot through suitable processes such as molding, casting, plating or printing processes using a conductive material, separately or together with other phase conductors. The end ring may be manufactured together with the conductors, or separately and then connected to the phase windings afterwards.

In some embodiments, the phase conductor connected to the connection ring 202 is inserted into an opening of the connection ring 202. Alternatively, the end of the phase conductor connected to the connection ring 202 may be connected to the top surface or protruding regions of the connection ring 202. The plurality of stator windings may be connected to the connection ring 202 through various processes such as welding, soldering and the like.

Figure 9:
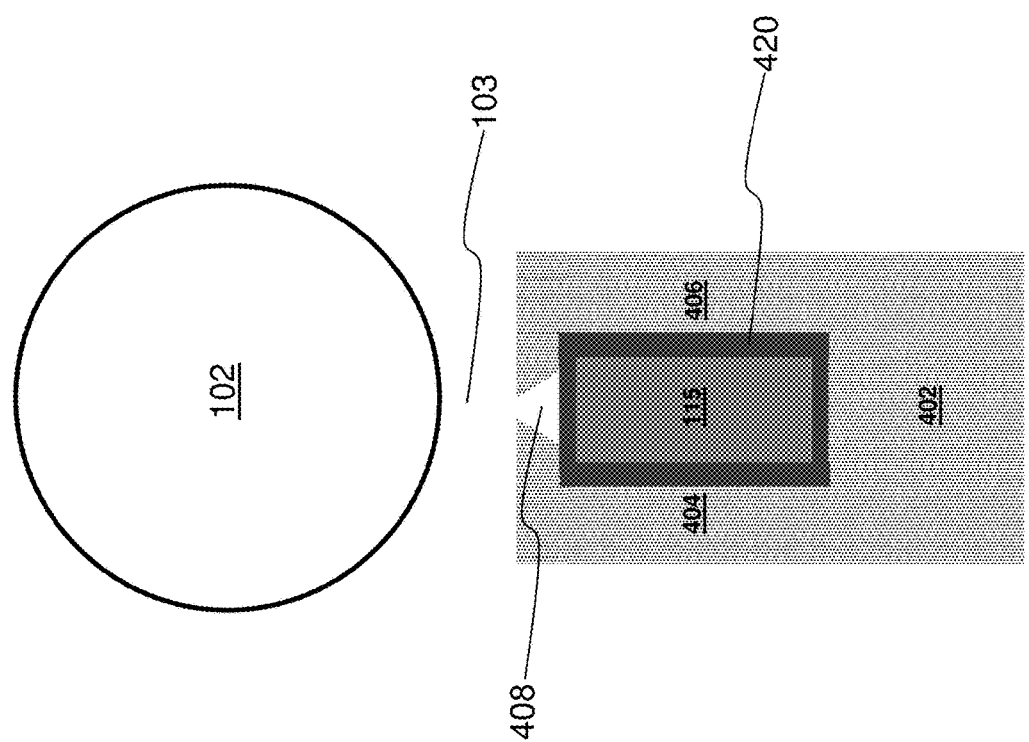
FIG. 9 illustrates a cross sectional view of an area around a stator slot in accordance with various embodiments of the present disclosure.

FIG. 9 illustrates a cross sectional view of an area around a stator slot taken along line A-A' in FIG. 6 in accordance with various embodiments of the present disclosure. A region 402 is a portion of the stator core called a yolk or a base. A first tooth 404 and a second tooth 406 are formed over the region 402. The region 402 and the teeth 404, 406 are called the core of the stator. The region 402 and the teeth 404, 406 are formed of a magnetic material such as a silicon steel laminate, a ferrite block, or a magnetic compound. A trench 408 is over the region 402 and between the first tooth 404 and the second tooth 406. The trench 408 is alternatively referred to as a slot. The sidewalls and the bottom of the trench may be coated with an insulation layer 420 to withstand a relatively high voltage.

The phase conductor 115 is embedded in the trench. There is usually an insulation layer 420 formed between the phase conductor 115 and the core of the stator if the conductor needs to withstand a relatively high voltage. Over the phase conductor 115, there is usually an opening that is sometimes filled with a mechanical support material, which may or may not be a magnetic-conducting material. In some embodiments, suitable materials such as solder paste may be filled in the slot 408. After a reflowing process, the solder paste forms a cap to further secure the stator winding's position.

As shown in FIG. 9, the stator and the rotor 102 are separated by the air gap 103. For brevity, only one stator winding (e.g., phase conductor 115) has been illustrated in FIG. 9. A person skilled in the art would understand the rotor 102 is surrounded by a plurality of stator windings.

Figure 10:
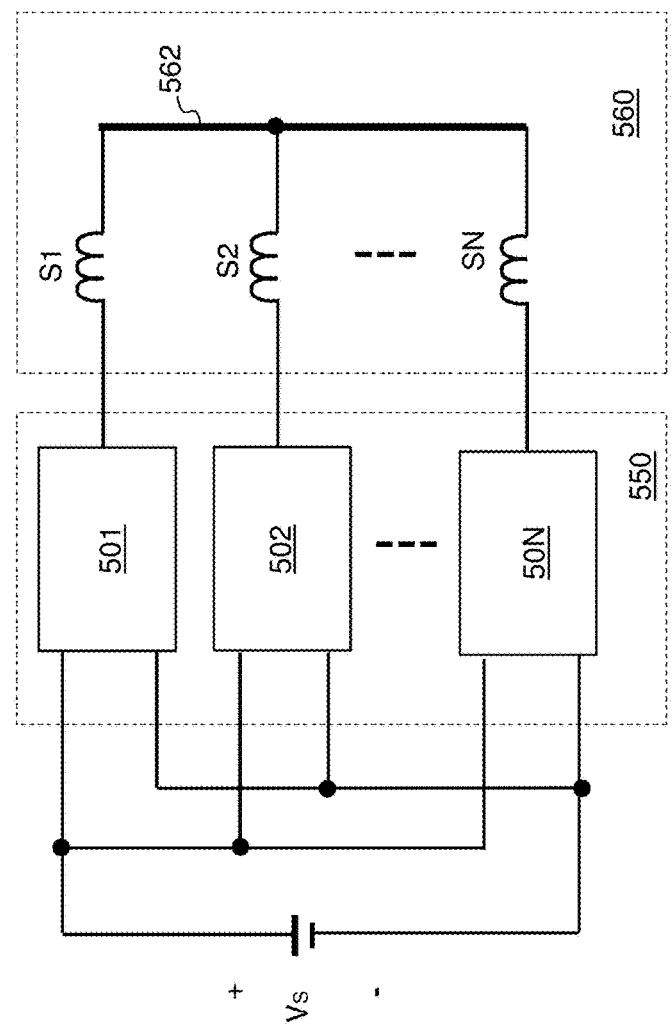
FIG. 10 illustrates a block diagram of a multi-phase motor system in accordance with various embodiments of the present disclosure.

FIG. 10 illustrates a block diagram of a reconfigurable motor system in accordance with various embodiments of the present disclosure. The reconfigurable motor system 500 comprises a reconfigurable motor 560 and the associated power converter group 550. In some embodiments, the reconfigurable motor 560 can be implemented as the reconfigurable motor shown in FIG. 7. In alternative embodiments, the reconfigurable motor 560 can implemented as any motor. As shown in FIG. 10, the reconfigurable motor 560 comprises a plurality of stator windings S1-SN and a connection ring 562.

The power converter group 550 comprises a plurality of power converters 501-50N. Each power converter (e.g., power converter 501) has an input connected to the power source Vs and an output connected to a corresponding stator winding (e.g., stator winding S1). As shown in FIG. 10, a first end of the stator winding (e.g., stator winding S1) is connected to the output of the corresponding power converter (e.g., power converter 501). A second end of the stator winding is connected to the connection ring 562. In an alternative embodiment, the second end of the stator winding may be connected to the corresponding power converter or coupled to the power source Vs. The structure of the power converter will be described in detail below with respect to FIG. 11.

Figure 11:
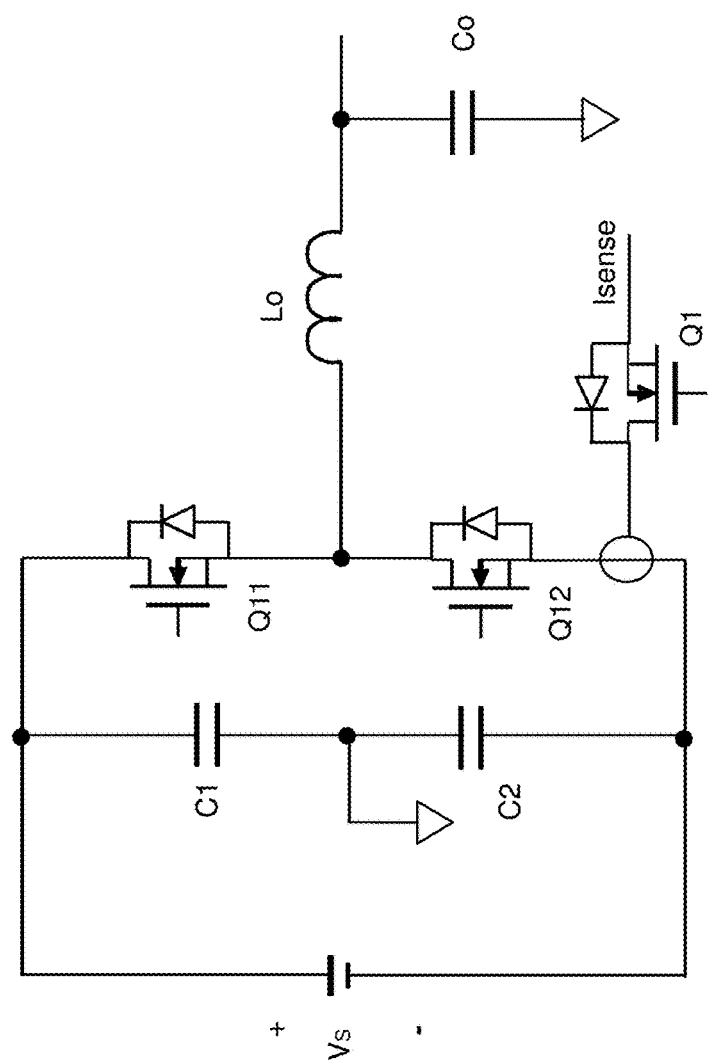
FIG. 11 illustrates a schematic diagram of a power converter suitable for using in the system shown in FIG. 9 in accordance with various embodiments of the present disclosure.

FIG. 11 illustrates a schematic diagram of a power converter suitable for using in the system shown in FIG. 10 in accordance with various embodiments of the present disclosure. In some embodiments, the power converter 501 is implemented as a half-bridge power converter. The half-bridge power converter 501 includes two switching elements, namely Q11 and Q12, and two capacitors, namely C1 and C2. The half-bridge power converter 501 further comprises a sense circuit comprising a switch Q1. The sense circuit is configured to sense the current in the corresponding phase winding. In the preferred embodiment, the control of the sense switch Q1 is configured such that the sense switch Q1 conducts only during Q12's conduction time. The gate drive signal of Q1 can be obtained based on the gate drive signal of Q12. It should be noted that the gate drive signal of Q12 should be shaped to avoid or reduce switching noise of Q11 and Q12. Furthermore, the gate drive signal of Q1 can be generated based on a sample clock whose timing is set to be insensitive to such switching noise.

As shown in FIG. 11, the switching elements Q11 and Q12 are connected in series between the output terminals of the power source Vs. Likewise, the capacitors C1 and C2 may be connected in series between the output terminals of the power source Vs. The common node of the switching elements Q11 and Q12 is coupled to an input of an L-C filter formed by an inductor Lo and an output capacitor Co as shown in FIG. 11. The common node of the capacitors C1 and C2 is coupled to ground. Please note that Lo and Co are optional, and the common node of Q11 and Q12 may be directly connected to a conductor of the motor. Similarly, C1 and C2 are also optional.

According to some embodiments, the switching elements Q11 and Q12 are implemented as MOSFET or MOSFETs connected in parallel, any combinations thereof and/or the like. According to alternative embodiments, the switching elements (e.g., switch Q1) may be an insulated gate bipolar transistor (IGBT) device. Alternatively, the switching elements can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a half-bridge converter (e.g., half-bridge converter 501 shown in FIG. 11), the implementation of the power converter shown in FIG. 11 may have many variations, alternatives, and modifications. For example, full-bridge converters, push-pull converters and inductor-inductor-capacitor (LLC) resonant converters may be alternatively employed in some suitable applications. In addition, the power source may be configured as a current source, and the power converter may be a current source inverter when needed.

In sum, the half-bridge converter 501 illustrated herein is limited solely for the purpose of clearly illustrating the inventive aspects of the various embodiments. The present invention is not limited to any particular power topology.

It should further be noted that while FIG. 6 illustrates two switches Q11 and Q12, various embodiments of the present disclosure may include other variations, modifications and alternatives. For example, a separate capacitor may be connected in parallel with each switch of the half-bridge converter 501. Such a separate capacitor helps to better control the timing of the resonant process and EMI of the half-bridge converter 501.

In some embodiments, the power source may be implemented as a plurality of power sources connected in series. Alternatively, the power source may be of a high voltage potential. The power source applied to the reconfigurable motor system can be divided into several input voltage sources having a lower voltage rating. In response to the multiple input voltage sources divided from the power source, the phase windings may be divided into several groups. The phase windings in each group may be connected to a separate connection bar as well as coupled to a separate input voltage sources. This configuration (multiple winding groups, multiple connection bars and multiple input voltage sources) for high input voltage applications will be described below with respect to FIG. 12.

Figure 12:
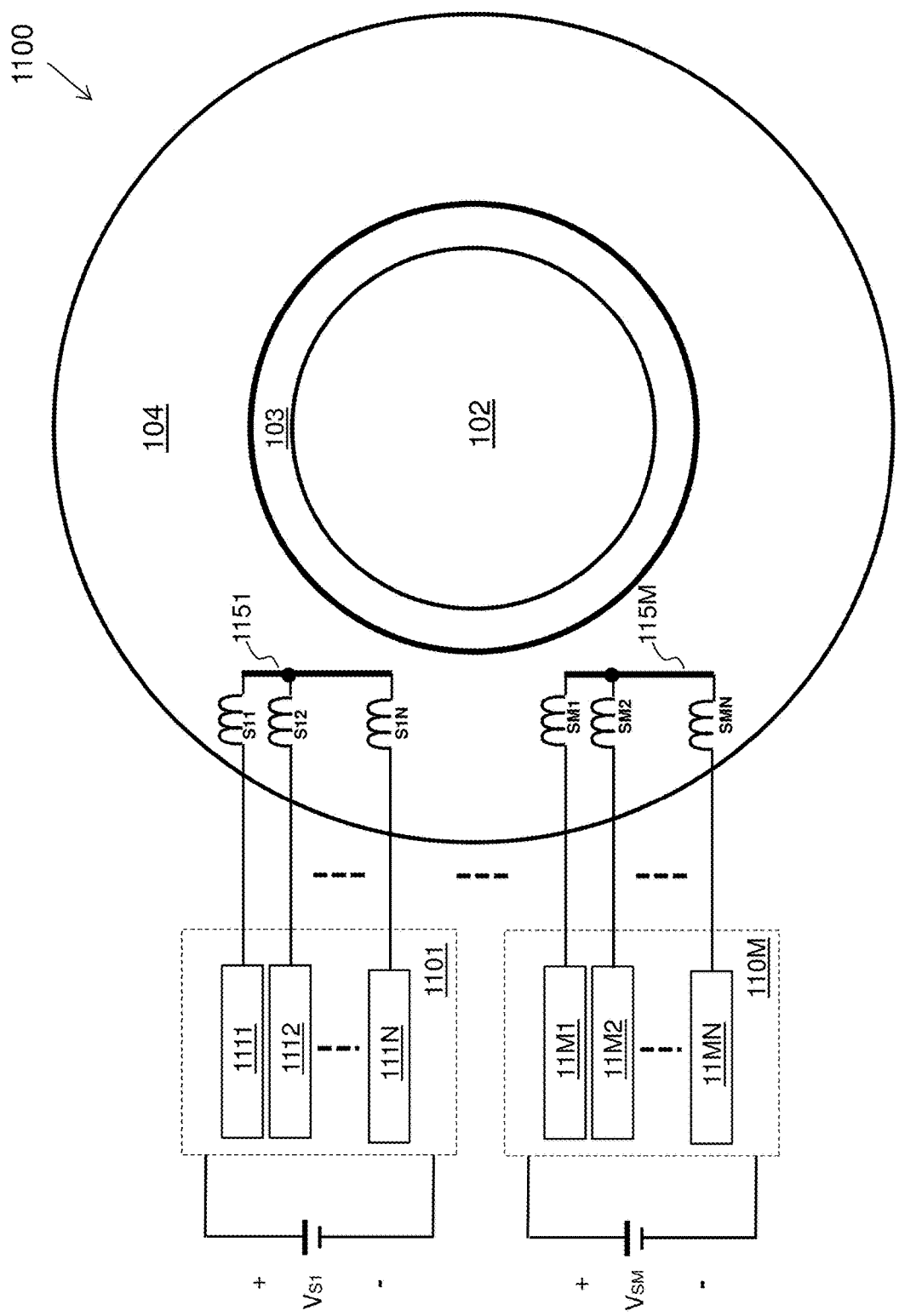
FIG. 12 illustrates a block diagram of a multi-phase motor system having multiple winding groups in accordance with various embodiments of the present disclosure.

FIG. 12 illustrates a block diagram of a reconfigurable motor system having multiple winding groups in accordance with various embodiments of the present disclosure. The reconfigurable motor system 1100 comprises a stator 104, a rotor 102 and an air gap 103. The stator 104 comprises a plurality of stator windings. The plurality of stator windings may be embedded in the stator core. More particularly, the stator core may comprise a plurality of slots. Each slot is employed to accommodate one stator winding. Alternatively, depending on different applications and design needs, each slot may be employed to accommodate multiple stator windings. In addition, the reconfigurable motor system may not include a stator core (e.g., a coreless motor), or there is no slot in the stator core.

As shown in FIG. 12, the plurality of stator windings is divided into M groups, where M is a predetermined integer. The stator windings of each group are connected by a connection ring. For example, the stator windings S11-S1N of the first group are connected by a first connection ring 1151 as shown in FIG. 12. Likewise, the stator windings SM1-SMN of the mth group are connected by an Mth connection ring 115M as shown in FIG. 12. In FIG. 12, the connection rings are shown floating (e.g., the connection rings are isolated from each other as shown in FIG. 12). In this disclosure, a connection ring may not be an enclosed shape, and thus can be a connection bar. If some of the M input power sources are isolated from each other, some of the connection rings 1151-115M may be electrically connected together, or form a single connection ring.

Furthermore, the reconfigurable motor system 1100 comprises a plurality of power converter groups. Each power converter group is connected between a power source and a corresponding stator winding group. As shown in FIG. 12, a first power converter group 1101 is connected between a first power source VS1 and the first group of the stator windings S11-S1N. The first power converter group 1101 comprises a plurality of power converters 1111-111N as shown in FIG. 12. Likewise, an Mth power converter group 110M is connected between an mth power source VSM and the mth group of the stator windings SM1-SMN. The Mth power converter group 110M comprises a plurality of power converters 11M1-11MN as shown in FIG. 12. In some embodiments, the plurality of power converters is divided into a plurality of power converter groups sequentially.

In some embodiments, the power sources VS1-VSM are separate power sources as shown in FIG. 12. In alternative embodiments, the power sources VS1-VSM are connected in series to accommodate a high input voltage applied to the reconfigurable motor system 1100. Furthermore, the power sources VS1-VSM may be developed from capacitors connected in series and coupled to a common power source. Thus, it may be important to achieve a charge balance among the power sources. In order to accomplish a charge balance of the power sources connected in series, it is desirable that the dc currents flowing in/out of the power sources are equal or approximately equal (e.g., within 20% tolerance) to each other.

In some embodiments, the power sources can perform efficiently and reliably when the current flowing through each power source is a dc current or a current having low low-frequency components. For example, the harmonic components (e.g., the fundamental and the low order harmonics) of the current should be reduced down to the minimum. In some embodiments, each winding group should have at least three stator windings evenly spaced in a pair of poles. The stator windings are configured to conduct currents with the same amplitude and frequency. Furthermore, the phase angles of the currents are evenly distributed among the stator windings. As a result, the stator windings in each winding group form a symmetrical and balanced multi-phase system, and the current flowing through each power source is a dc current in ideal operation.

Figure 13:
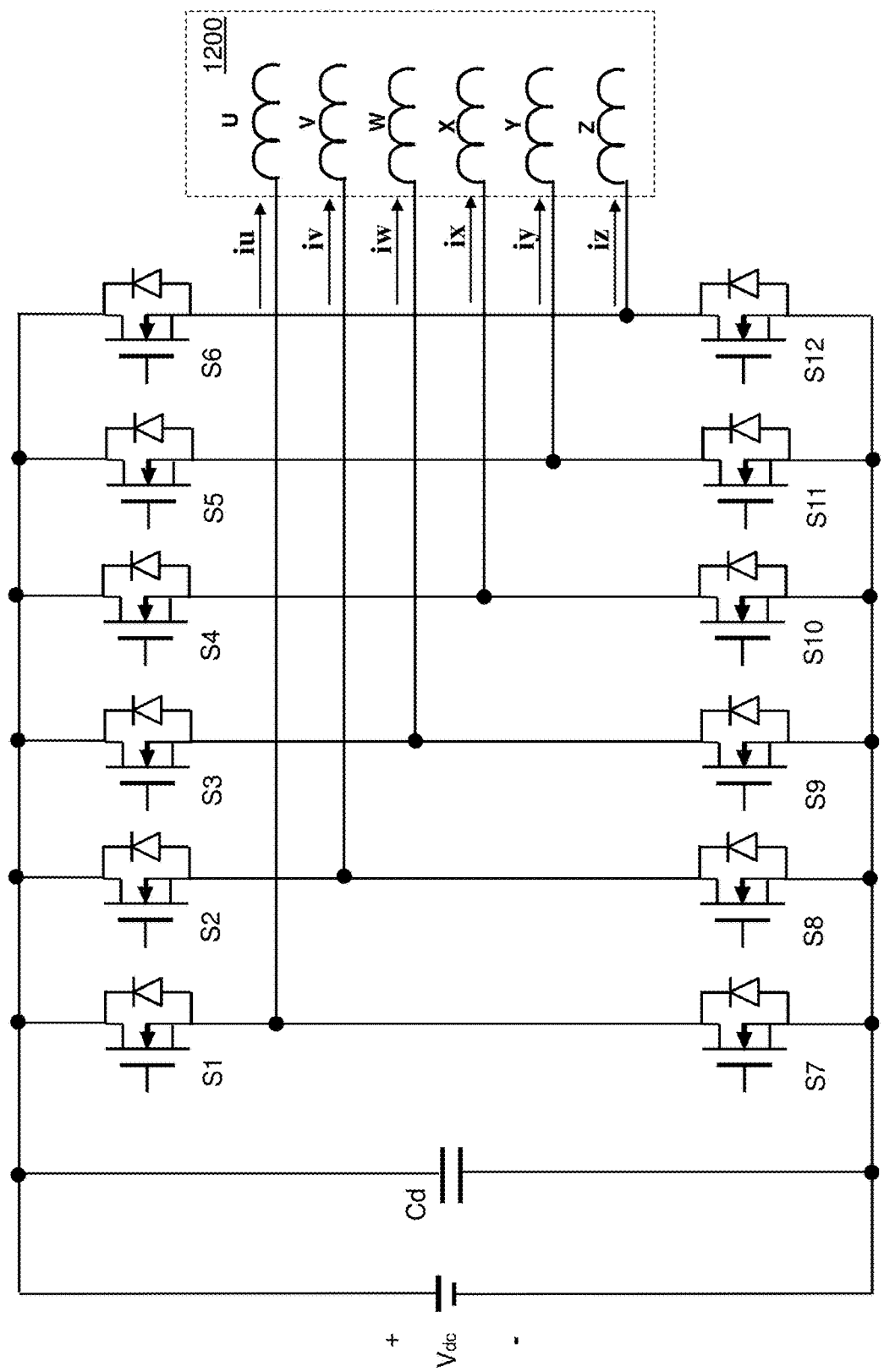
FIG. 13 illustrates a schematic diagram of a multi-phase motor system having six windings in accordance with various embodiments of the present disclosure.

FIG. 13 illustrates a schematic diagram of a reconfigurable motor system having six windings in accordance with various embodiments of the present disclosure. The reconfigurable motor system 1200 is similar to that shown in FIG. 12 expect that the reconfigurable motor system 1200 includes six windings, namely windings U, V, W, X, Y and Z as shown in FIG. 13. Each winding is driven by a power converter leg (e.g., power converter leg formed by S1 and S7). In some embodiments, the power converter leg is an inverter. The inverter comprises a high-side switch and a low-side switch. The high-side switch and the low-side switch of the inverter are controlled by a PWM control scheme in a complementary way with a dead time between their respective conduction periods. The inverter is employed to convert a dc voltage into an ac voltage suitable for driving a winding of the reconfigurable motor system 1200.

As shown in FIG. 13, the dc voltage is from a power source Vdc and is coupled to the power converters across a dc link comprising a positive lead and a negative lead. In some embodiments, the power source Vdc is a battery having a suitable voltage such as 48 V. An input capacitor Cd is employed to reduce the ripple voltage components at the output of the power source Vdc.

As shown in FIG. 13, switches S1 and S7 are connected in series between the positive terminal and the negative terminal of the power source Vdc. Switches S1 and S7 form a first power converter leg, which is employed to drive the first winding U. Likewise, switches S2 and S8 form a second power converter leg, which is employed to drive the second winding V. Switches S3 and S9 form a third power converter leg, which is employed to drive the third winding W. Switches S4 and S10 form a fourth power converter leg, which is employed to drive the fourth winding X. Switches S5 and S11 form a fifth power converter leg, which is employed to drive the fifth winding Y. Switches S6 and S12 form a sixth power converter leg, which is employed to drive the sixth winding Z.

It should be noted while FIG. 13 shows the plurality of power converter legs shares a single power source Vdc, the reconfigurable motor system may include a plurality of power sources connected in series. More particularly, when the input voltage of the reconfigurable motor system is high, the reconfigurable motor system may include a plurality of power sources connected in series (e.g., the power sources shown in FIG. 12). On the other hand, when the input voltage of the reconfigurable motor system is low (e.g., a battery having 48 V), the reconfigurable motor system may be powered by a single power source (e.g., the power source Vdc shown in FIG. 13).

Figure 14:
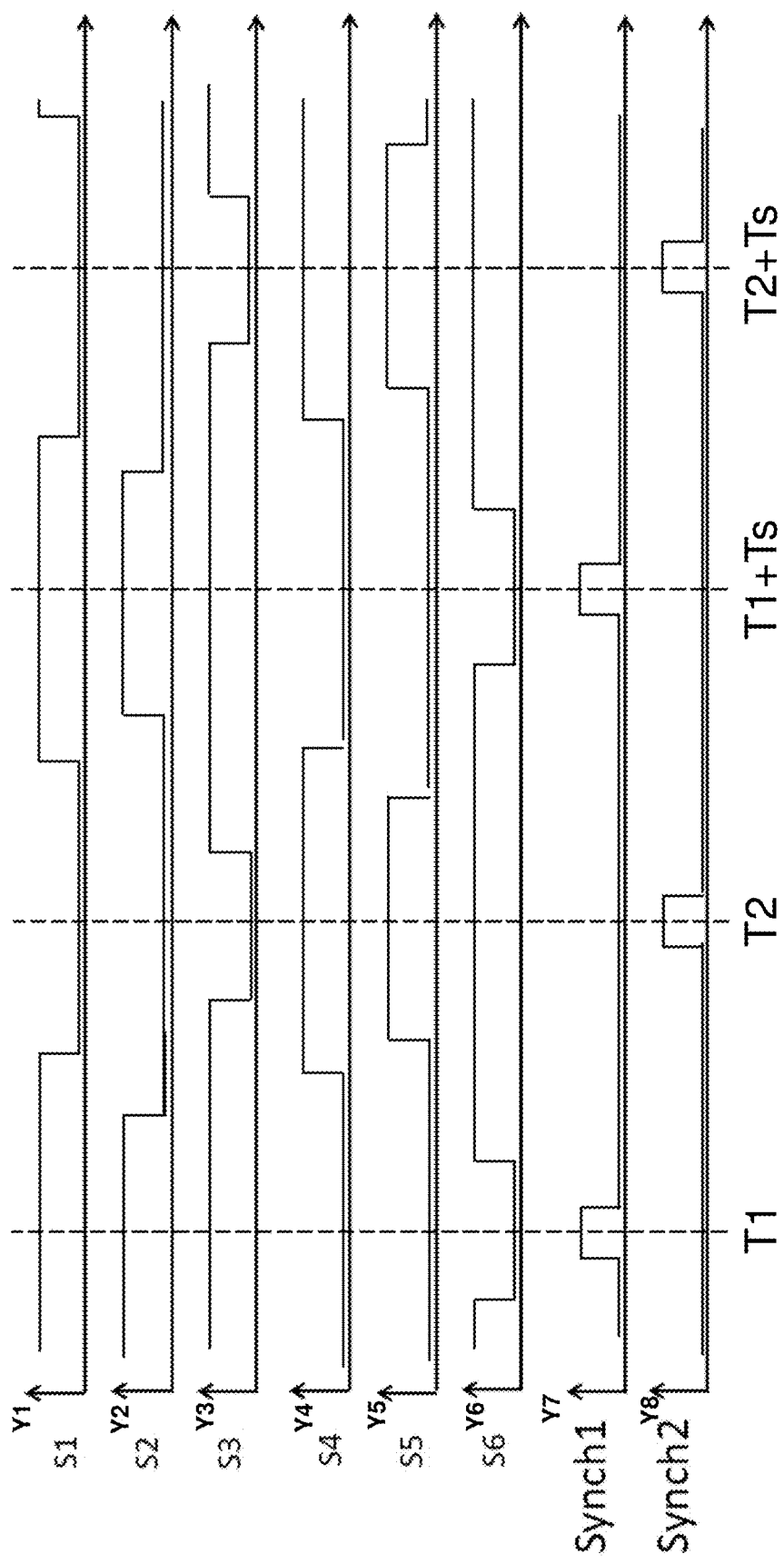
FIG. 14 illustrates various control signals of the motor system having six windings shown in FIG. 13 in accordance with various embodiments of the present disclosure.

The ripple current in the dc link of a power converter group may directly affect the power loss, size and cost of the filter capacitor of the dc link. To reduce the ripple current in the dc link of a power converter group, an improved control mechanism of the duty cycles of the switches in a power converter group should be used. FIG. 14 illustrates various control signals of the motor system having six windings shown in FIG. 13 in accordance with various embodiments of the present disclosure. The horizontal axis of FIG. 14 represents intervals of time. Eight vertical axes are shown in FIG. 14. The first vertical axis Y1 represents the gate drive signal of S1 shown in FIG. 13. The second vertical axis Y2 represents the gate drive signal of S2 shown in FIG. 13. The third vertical axis Y3 represents the gate drive signal of S3 shown in FIG. 13. The fourth vertical axis Y4 represents the gate drive signal of S4 shown in FIG. 13. The fifth vertical axis Y5 represents the gate drive signal of S5 shown in FIG. 13. The sixth vertical axis Y6 represents the gate drive signal of S6 shown in FIG. 13. The seventh vertical axis Y7 represents a first synchronization signal Synch1 of the motor system. The eighth vertical axis Y8 represents a second synchronization signal Synch2 of the motor system. The first and second synchronization signals are positioned with an offset in time which is equal to (T2−T1), and the system has a period of Ts.

The plurality of power converters (e.g., power converter formed by S1 and S7) is divided into a first power converter group and a second power converter group. The first power converter group includes switches S1, S2 and S3. The second power converter group includes switches S4, S5 and S6. As shown in FIG. 14, gate drive signals of power switches S1-S3 in the first power converter group are synchronized to a first synchronization signal Synch1. The centers of the gate drive signals of the switches S1-S3 may be vertically aligned with the center of the first synchronization signal Synch1 as shown in FIG. 14.

Gate drive signals of power switches S4-S6 in the second power converter group are synchronized to a second synchronization signal Synch2. The centers of the gate drive signals of the switches S4-S6 may be vertically aligned with the center of the second synchronization signal Synch2 as shown in FIG. 14. Furthermore, the first synchronization signal Synch1 and the second synchronization signal Synch2 are interleaved, and the interleave angle is determined by 360°·(T2−T1)/Ts. Depending on different applications and design needs, there may be different interleaving modes with different interleave angles.

In a preferred embodiment, the motor is configured to operate under a first number of pole pairs and a second number of pole pairs. When the motor is configured to operate under the first number of pole pairs, the plurality of power converters is configured to operate in a first interleaving mode. When the motor is configured to operate under the second pair of poles, the plurality of power converters is configured to operate in a second interleaving mode. In the first interleaving mode and in the second interleave operation mode, the interleave angle may be different. The interleave angle may be adjusted to improve the performance of the system. Usually, the root mean square (RMS) ripple current in the dc link is an important performance parameter to be considered. When system operation parameters such as power factor, dc link voltage or motor ole pole number changes, the optimum interleave angle may also be changed. In one mode, the interleave angle may be equal to 90 degrees. In another mode, the interleave angle may be equal to 45 degrees. In yet another mode, the interleave angle may be equal to 180 degrees or 0 degrees (i.e. the system does not have not an interleaving mode). In yet another mode, the interleave angle may be equal to 30 degree or a specific angle which gives good performance in that operating condition.

In an operation mode, the windings coupled to the power converters having the same clock signal may form a complete pair of poles in the motor. In another operation mode, the power converters coupled to all windings in a pair of poles may be divided into a plurality of subgroups, and each subgroup may have a clock signal. As long as the power converters in a group coupled to the same synchronization signal form a balanced multi-level system, good ripple reduction of the dc-link current can be achieved. This reduction can significantly reduce the power loss and disturbance on the bus bar discussed above.

One advantageous feature of having multiple synchronization signals with interleaving is that the synchronization may also reduce the ripple of winding currents and the motor flux, thereby resulting in low noise and/or power losses. It may also reduce the ripple current in the dc link capacitors which are usually connected in parallel with a power source, and thus reduce the requirements and the cost of such dc link capacitors.

Traditionally, for high-performance ac drives all or all but one phase winding current (phase current) need to be sensed, so every phase current can be calculated for controlling the motor. When the number of phase windings is high, this can cause a significant cost increase. Since the primary goal of controlling an electrical machine is to provide required power or torque, and to maintain a suitable flux pattern in the airgap of the machine, as long as the torque component and the flux component of the phase currents can be calculated and controlled. As a result of having this, the basic performance of the motor/generator system can be guaranteed. In the motor shown in FIG. 12, the windings are divided into multiple symmetrical groups (please note that the windings in a group do not have to be adjacent to each other physically). In operation, the current in a winding in a group usually is approximately the same as the current in the corresponding winding in another group. This means that if a group has M windings, it is only necessary to sense M currents or (M−1) currents if all M currents in a group sum up to zero. In some applications, in a group there is a reverted symmetry between a half of the windings and the other half of the windings, it is possible to further reduce the number of the sensed phases to about M/2. Therefore it is possible to reduce the number of sensed phase currents and use the symmetry of the machine and power converter operation to complete all required control functions. Depending on whether the current in a phase is sensed or not, a phase can be classified as a sensed phase or an un-sensed phase. Such a scheme is called reduced-phase current sensing. All sensed phases may be coupled to a converter group, or be scattered among different converter groups.

In some embodiments, there are two ways to implement the reduced-phase current sensing in a high-performance control system. A first implementation of the reduced-phase current sensing is a pole-pair based reduced-phase current sensing method. As the operation between different pair of poles within a motor is more or less symmetrical, the current of a phase winding within a pair of poles may be considered approximately the same as the corresponding phase winding current in another pair of poles of the same motor and/or generator, at least in average sense. Therefore, only the winding currents in one (or more) pair of poles need to be sensed and actively controlled, and the winding currents in the remaining un-sensed pairs of poles can be assumed to be equal to the corresponding phase currents in the sensed pair of poles. The duty cycle of any switch coupled to the un-sensed pairs of poles can also be assumed to be the same as that of the corresponding switch coupled to a sensed pair of poles. If the phase currents in more than one pairs of poles are sensed, then an average value of the corresponding phases in all the sensed pairs can be used. The torque and flux control is very similar to conventional ac drive control except that a proper scaling factor should be used considering that the windings in each un-sensed pair of poles should generate the same amount of flux linkage and toque as the windings in a sensed pair of poles (power invariant principle).

A second implementation of the reduced-phase current sensing is a partial-pair based reduced-phase current sensing method. Modern ac drives are usually controlled by field-oriented control (FOC) or other strategies with torque and flux control. Therefore, flux linkage and torque information is very important, and flux linkage is usually calculated based on pole pairs. If not all phase currents within a pair of poles are sensed, and then as long as the flux and torque components of the phase currents can be calculated considering the symmetry between different pole pairs and converter/winding groups, a proper control method may still be achieved. The sensed phase currents, which may or may not be arranged within a pair of poles or a power converter/winding group, can be used to estimate or observe the currents in the un-sensed phases. Then the control scheme is similar to traditional schemes except that the duty cycle of switches in an un-sensed phase is estimated or observed from the duty cycle of switches in a corresponding sensed phase or duty cycles of switches in corresponding sensed phases. Alternatively, a new control scheme based on reduced current sensing scheme maybe used. The sensed phase currents are first converted to an orthogonal stationary αβ frame at a fundamental frequency using a coordinate transfer such as modified Clark transfer considering the space angels of each phase winding within the pair of poles. The α axis is aligned with the first phase in the pair of poles, and the β is perpendicular to the α axis space-wise. The columns in the standard transfer matrix corresponding to un-sensed phases are removed. If the sensed phase windings are not spaced symmetrical in the pair of poles, then the coordinate transfer matrix will not be symmetrical. Then the αβ reference frame can be transferred to a d-q frame using conventional Park transfer with a proper scaling factors assuming each un-sensed winding contributes the same amount of flux linkage and torque as a sensed winding (power invariant principle). However, only the phase currents in the sensed phases can be controlled in a close loop. When the control voltages (duty cycles) of the sensed phases are generated, it is important to use such information to get control voltages (duty cycles) for all phases. First, the known control voltages can be transferred to an orthogonal αβ frame using the modified Clark transfer as described above with a proper scaling considering power invariant principle, and then through the modified Clark transfer, the αβ frame values of the control voltages can be used to calculate the control voltages for the un-sensed phases. This control expansion is achieved in a full-phase expansion block in FIG. 17.

Figure 15:
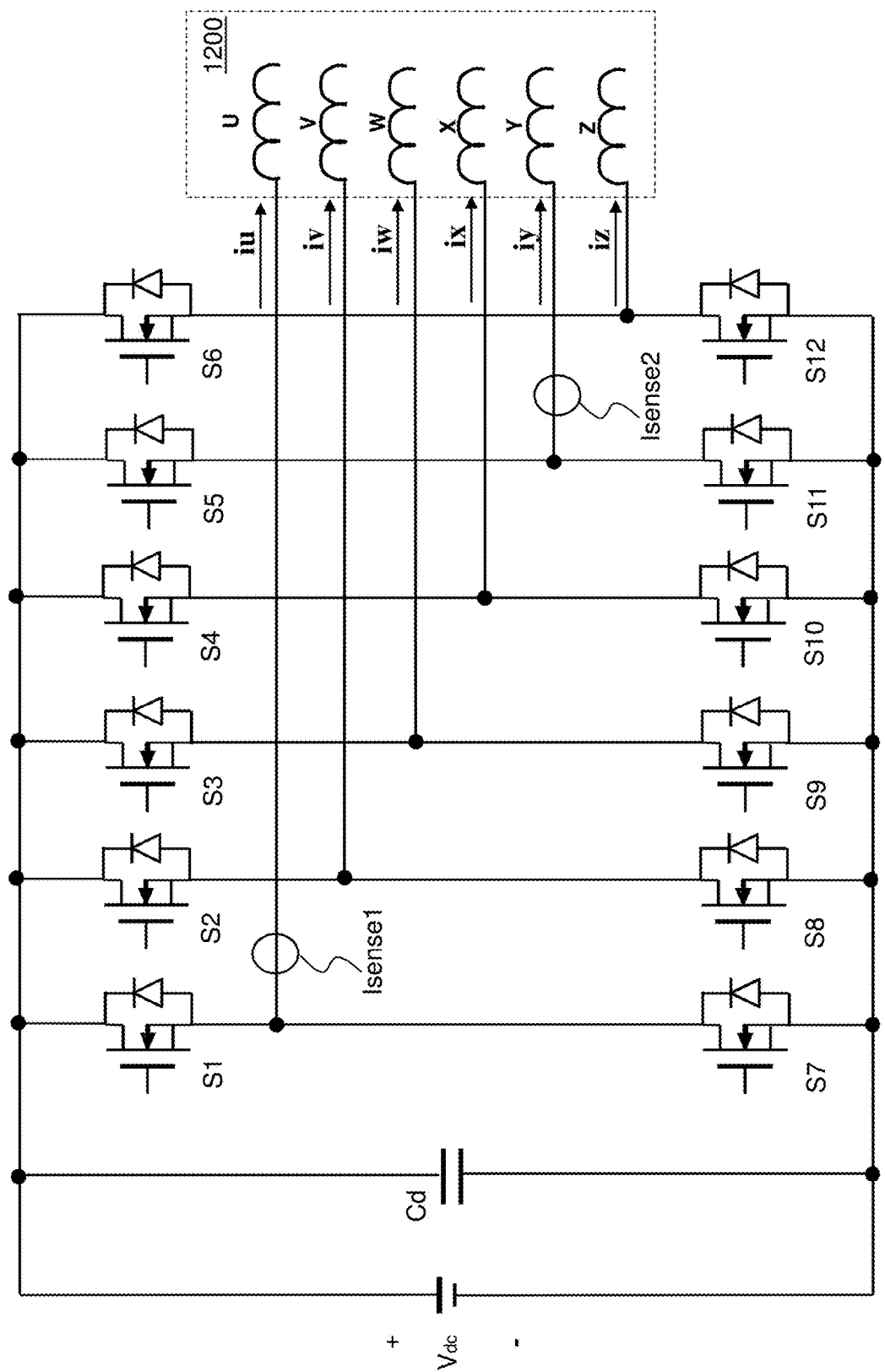
FIG. 15 illustrates a schematic diagram of a multi-phase system having reduced-phase current sense devices in accordance with various embodiments of the present disclosure.

FIG. 15 illustrates a schematic diagram of reduced-phase current sense devices in accordance with various embodiments of the present disclosure. The example motor system includes six phases and may be a reconfigurable motor system. In some embodiments, only two current sense devices are employed to sense the currents. The motor system is able to achieve high performance operation based upon the sensed current signals from the two current sense devices.

In some embodiments, the plurality of power converters and the plurality of windings are arranged into a plurality of symmetric groups. A plurality of current sense devices (e.g., two current sense devices shown in FIG. 15) is configured to detect currents flowing through the motor. The number of the plurality of windings is significantly greater than the number of the current sense devices, so some winding currents are estimated or observed from the sensed currents. The estimation or observation may consider the symmetry and phase relationship between the phases in a multi-phase system. In one embodiment, the current in a winding is estimated or observed only based on the current information in a corresponding winding in another pole pair which is in the same physical location in that pair. For example, the current in the first winding of a pole pair is used to estimate or observe the current in the first winding in another pole pair where the two pole pairs are symmetrical. Alternatively, currents in adjacent windings may also be used to estimate or observe the current in a winding considering the phase relationship of them. Similarly, the duty cycle of a switch in a power converter in an un-sensed phase may be estimated or observed from the duty cycle information of other switches.

In the example system, the motor is configured to operate with a first pair of poles and a second pair of poles. The plurality of power converters is divided into a first power converter group and a second power converter group. The first power converter group includes switches S1-S3 and S7-S9. The second power converter group includes switches S4-S6 and S10-S12.

A first current sense device Isense1 is configured to detect a current flowing through a first power converter of the first power converter group. A second current sense device Isense2 of the plurality of current sense devices is configured to detect a current flowing through a second power converter of the second power converter group.

Figure 16:
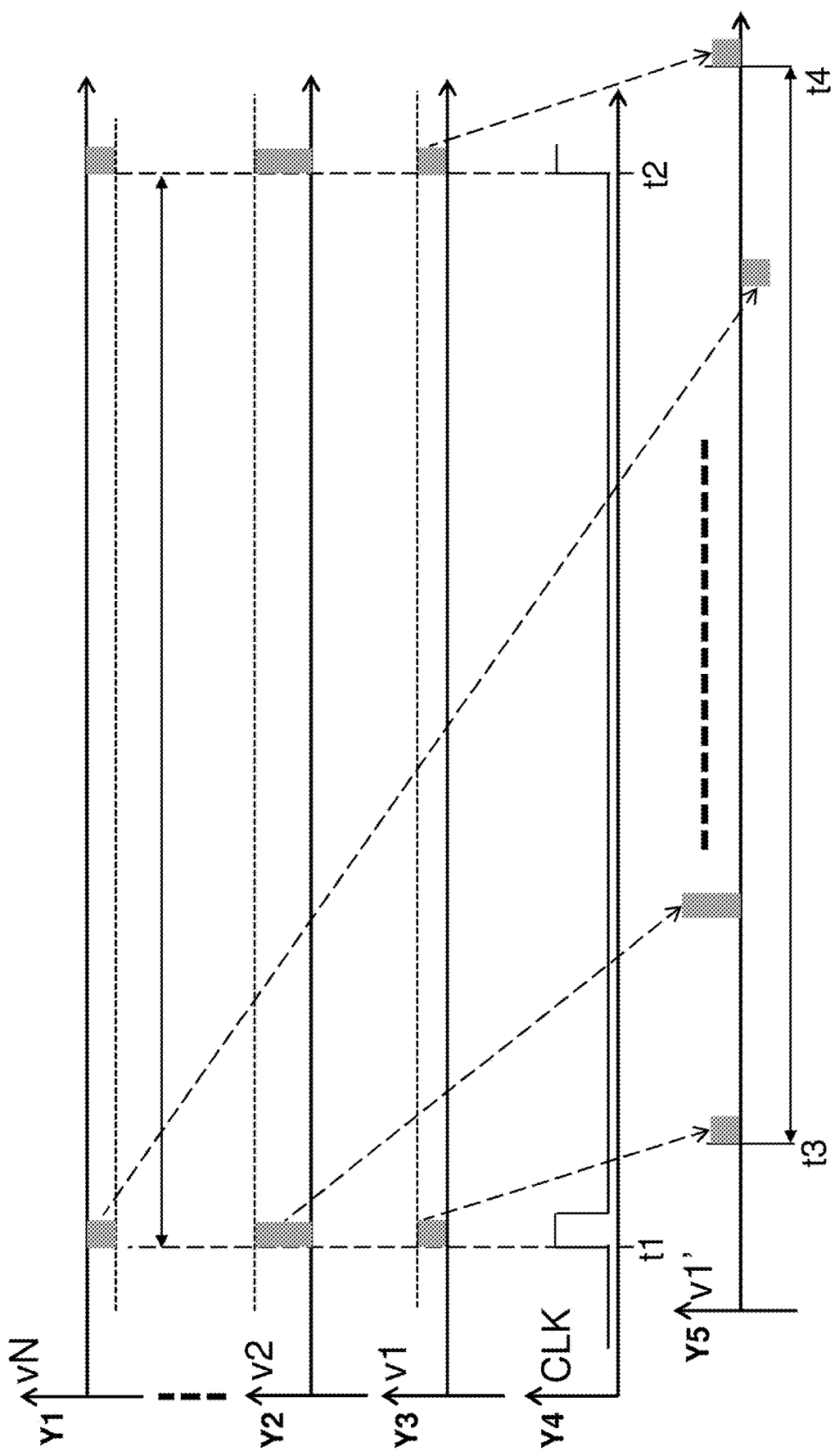
FIG. 16 illustrates various signals in a multi-phase system in accordance with various embodiments of the present disclosure.

FIG. 16 shows an example of generating the pseudo waveform in accordance with various embodiments of the present disclosure. In some embodiments, a group has N windings and N power converters. A variable v (e.g., winding voltage or current) is to be observed. This variable is designated as v1 in a first power converter or a first winding. This variable is designated as v2 in a second power converter or a second winding. This variable is designated as vN in an nth power converter or an nth winding.

In steady-state and symmetrical operation, signals v1 through vN should have the same waveform but with different phase angles. By measuring v1, v2, . . . , vN approximately at the same time, the values at different phase angles (which correspond to different time intervals) of the waveform of a variable can be estimated accordingly. As shown in FIG. 16, the pseudo waveform v1' is an estimated or observed signal for v1 which is constructed or predicted by utilizing the sensed signals from other power converters or windings.

FIG. 16 illustrates various signals in a multi-phase motor system having multiple winding groups shown in FIG. 12 in accordance with various embodiments of the present disclosure. The horizontal axis of FIG. 16 represents intervals of time. There may be five vertical axes. The first vertical axis Y1 represents the sampled signal of a variable in the nth power converter 50N or nth winding SN shown in FIG. 10. The second vertical axis Y2 represents the sampled signal of a variable in the second power converter 502 or second winding S2 shown in FIG. 10. The third vertical axis Y3 represents the sampled signal of a variable in the first power converter 501 or first winding S1 shown in FIG. 10. The fourth vertical axis Y4 represents the clock signal for sample and hold function of the system. The fifth vertical axis Y5 represents V1' (a pseudo waveform).

In FIG. 16, the time from t3 to t4 is defined as a sampling cycle, which is equal one over f, where f is the sampling frequency. By using the pseudo signal shown in FIG. 16, the performance of the system can be improved even if the sampling frequency is relatively low.

Figure 17:
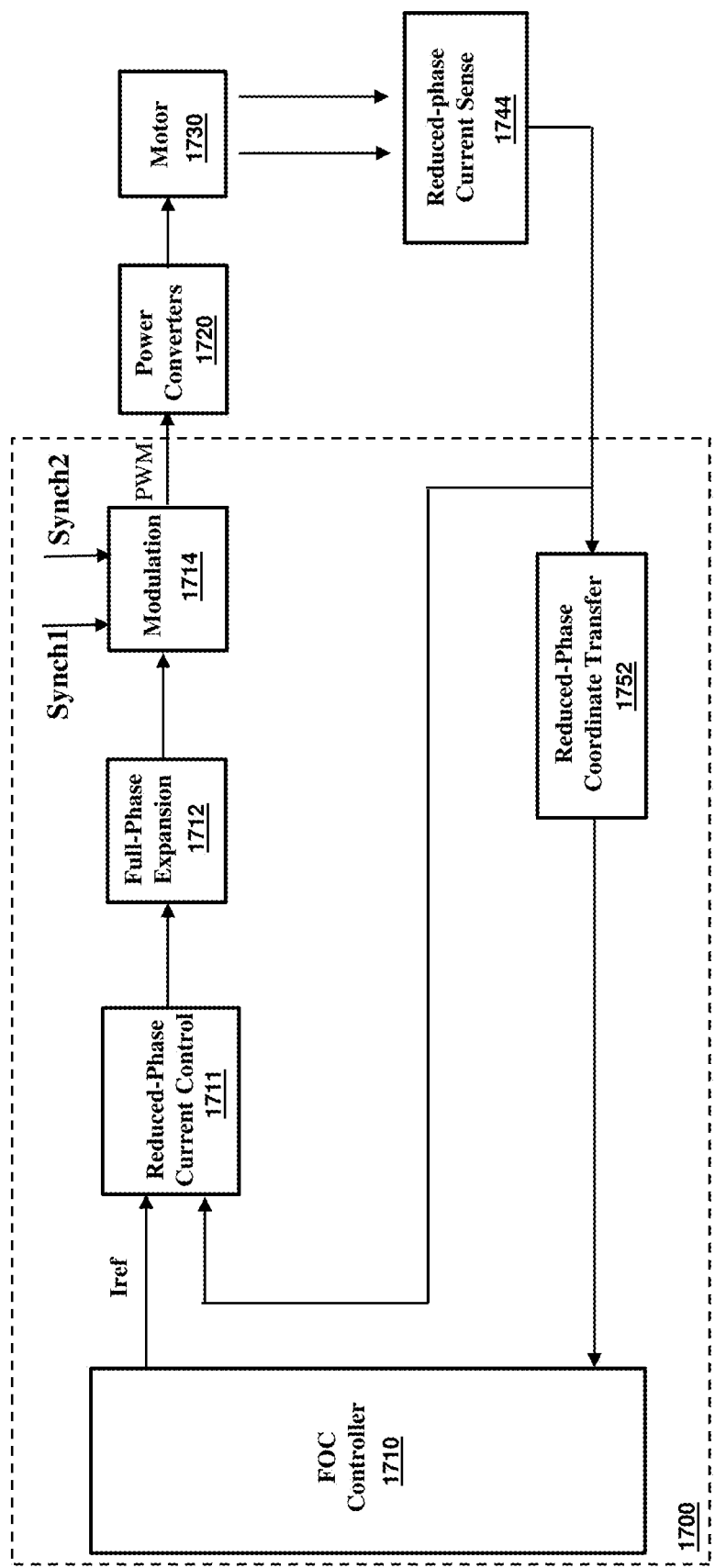
FIG. 17 illustrates a block diagram a control system having the reducing current sensing control mechanism in accordance with various embodiments of the present disclosure.

FIG. 17 illustrates a block diagram a control system having the reducing current sensing control mechanism in accordance with various embodiments of the present disclosure. The motor system comprises a motor 1730, a plurality of power converters 1720 and a controller 1700. In order to generate control signals for the power converters and control the motor in an efficient manner, a plurality of system operation parameters may be fed into the controller 1700. As shown in FIG. 17, a reduced-phase current sense apparatus 1744 may be employed to detect currents flowing through two phases of the motor system. The output of the reduced-phase current sense apparatus 1744 is fed into the controller 1700.

The controller 1700 comprises a reduced-phase coordinate transfer unit 1752, a field-oriented control unit 1710, a reduced-phase current control unit 1711, a full-phase expansion unit 1712 and a modulation unit 1714. As shown in FIG. 17, an input of the reduced-phase coordinate transfer unit 1752 is configured to receive an output signal of the reduced-phase current sense apparatus 1744. An input of the field-oriented control unit 1710 is configured to receive an output signal of the reduced-phase coordinate transfer unit 1752. Inputs of the reduced-phase current control unit 1711 are configured to receive an output signal of the field-oriented control unit 1710 and the output signal of the reduced-phase current sense apparatus 1744 respectively. An input of the full-phase expansion unit 1712 is configured to receive an output signal of the reduced-phase current control unit 1711. An input of the modulation unit 1714 is configured to receive an output signal of the full-phase expansion unit 1712.

In operation, the reduced-phase coordinate transfer unit 1752 is configured to convert sensed current signals into variables in an orthogonal stationary frame. More particularly, the field-oriented control unit 1710 may require a coordinate transfer unit (e.g., the reduced-phase coordinate transfer unit 1752) to convert current/voltage/flux signals between two different coordinate systems. For example, the reduced-phase coordinate transfer unit 1752 is employed to convert a set of signals from a stationary phasor system to a synchronous d-q system. Coordinate transfer is a well-known technique in the motor control, and hence is not discussed herein.

The field-oriented control unit 1710 is configured to generate a reference current signal based upon the variables in the orthogonal stationary frame. In particular, the field-oriented control unit 1710 may be employed to generate various references for winding currents. As shown in FIG. 17, the references generated by the field-oriented control unit 1710 are fed into the reduced-phase current control unit 1711 to generate control signals for the power switches of the power converters 1720. Many field-oriented control methods are known in the industry and are not repeated here. It should be noted that some of the field-oriented control methods need to observe the flux linkage in the motor.

It should be noted that the current references Iref may only comprise fundament-frequency components. With the current control in the reduced-phase current control block implemented based on each sensed phase, higher order harmonic current may be naturally suppressed by the control system. However, to allow for some magnetic saturation, the 3rd order harmonic current may be allowed by making the compensator gain in the current control to very low at the $3^{rd}$ order frequency, at lease for the magnetizing (flux) component. Usually, a resonant compensator or resonant filter setting at the right frequency can be used for this purpose.

The reduced-phase current control unit 1711 is configured to generate first control voltages for phases having current sense devices. The full-phase expansion unit 1712 is configured to generate second control voltages for phases not having current sense devices based upon the first control voltages.

The modulation unit 1714 is configured to generate gate drive signals based on a plurality of clock or synchronization signals for the plurality of power converters 1720 based upon the first control voltages and the second control voltages. In some embodiments, the modulation unit 1714 is configured to have multiple synchronization signals such that gate drive signals of power switches in the first block of power converters of the plurality of power converters are synchronized to a first synchronization signal Synch1, and gate drive signals of power switches in the second block of power converters of the plurality of power converters are synchronized to a second synchronization signal Synch2. The first synchronization signal and the second synchronization signal are interleaved. In some embodiments, the number of synchronization signals may be more than two. In some embodiments, the interleave angle of the synchronization signals may change from one operation mode to another.

The above discussed methods may be used to control the drive system even when some phase windings or some phase legs are failed. This will enhance the fault-tolerant capability and safety of the system.

It should be noted that the number of pole pairs and the number of phases in a pair of poles may be fixed, or may be dynamically adjusted in a motor or generator.

These techniques can be applied to different types of electrical machines, such as induction machine, permanent magnet synchronous machine, doubly-fed machines, etc.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   providing a motor comprising a plurality of windings, a rotor and a stator magnetically coupled to the rotor;
   coupling a plurality of power converters between a power source and the plurality of windings through a dc link;
   dividing the plurality of power converters into a plurality of groups, wherein a first group of power converters are synchronized to a first synchronization signal, and a second group of power converters are synchronized to a second synchronization signal, and wherein the first synchronization signal and second synchronization signal are interleaved with an interleave angle; and
   configuring the plurality of power converters to operate in a first interleaving mode during a first operation mode and operate in a second interleaving mode during a second operation mode, wherein the motor is configured to operate under a first number of pole pairs under the first operation mode and under a second number of pole pairs under the second operation mode, and the interleave angle in the first interleaving mode is different from the interleave angle in the second interleaving mode.

2. The method of claim 1, further comprising:
   controlling the plurality of power converters to dynamically adjust the number of poles of the motor; and
   after the step of controlling the plurality of power converters to dynamically adjust the number of poles of the motor, configuring the plurality of power converters to leave the first interleaving mode and enter into the second interleaving mode with a different interleave angle.

3. The method of claim 1, wherein:
   the dc link is implemented as a bus bar, and a protective device is integrated in the bus bar.

4. The method of claim 1, wherein:
   at least one of the interleave angles of the first interleaving mode and the second interleaving mode is equal to 360/(2·N) degrees, wherein N is the number of interleaved synchronization signals.

5. The method of claim 1, wherein:
   at least one of the interleave angles of the first interleaving mode and the second interleaving mode is adjusted according to a change in an operating parameter of the plurality of power converters or the motor.

6. The method of claim 1, wherein:
   at least one of the interleave angles of the first interleaving mode and the second interleaving mode is equal to 0 degrees or 180 degrees.

7. The method of claim 1, wherein:
   a group of power converters of the plurality of groups form a balanced multi-phase system.

8. The method of claim 7, wherein:
   the group of power converters is coupled to a group of windings, and wherein the group of windings belongs to one pair of poles of the motor during the operation mode.

9. The method of claim 7, wherein:
   the group of power converters is coupled to a group of windings, and wherein the group of windings belongs to multiple pairs of poles of the motor during the operation mode.

10. A method comprising:

providing a motor comprising a plurality of windings, a rotor and a stator magnetically coupled to the rotor;

coupling a plurality of power converters to the plurality of windings, wherein the plurality of power converters is coupled to a power source through a dc link;

configuring the plurality of power converters to operate in a first interleaving mode;

configuring the plurality of power converters to adjust the number of poles of the motor; and after adjusting the number of poles of the motor, configuring the plurality of power converters to leave the first interleaving mode and enter into a second interleaving mode, wherein an interleave angle in the first interleaving mode and an interleave angle in the second interleaving mode are selected to reduce a ripple current flowing through the dc link.

11. The method of claim 10, further comprising:

dividing the plurality of power converters into a plurality of groups, wherein:

a first group of power converters are synchronized to a first synchronization signal; and a second group of power converters are synchronized to a second synchronization signal, and wherein the first synchronization signal and second synchronization signal are interleaved with a predetermined interleave angle.

12. The method of claim 11, wherein:

the predetermined interleave angle is equal to 90 degrees.

13. The method of claim 11, wherein:

centers of gate drive signals of the first group of power converters are vertically aligned with a center of the first synchronization signal; and centers of gate drive signals of the second group of power converters are vertically aligned with a center of the second synchronization signal.

14. The method of claim 10, wherein:

each of the first group of power converters is an inverter comprising a first switch and a second switch connected in series between two terminals of the dc link.

15. The method of claim 14, wherein:

a corresponding winding coupled to the inverter is connected to a common node of the first switch and the second switch.

16. A method comprising:

coupling a plurality of power converters to a motor comprising a plurality of windings, each of the plurality of windings being coupled to a dedicated power converter;

in a first operating mode, synchronizing a first group of power converters and a second group of power converters of the plurality of power converters to a first synchronization signal and a second synchronization signal, respectively, wherein a first interleave angle is placed between the first synchronization signal and the second synchronization signal;

configuring the motor to operate in a second operating mode in response to a variation of the number of poles of the motor; and in the second operating mode, placing a second interleave angle between the first synchronization signal and the second synchronization signal, wherein the second interleave angle is different from the first interleave angle.

17. The method of claim 16, wherein:

the plurality of power converters is a plurality of inverter legs connected in parallel across a dc link coupled to a power source.

18. The method of claim 17, wherein:

the first interleave angle and the second interleave angle are configured to reduce a root mean square (RMS) ripple current in the dc link.

19. The method of claim 16, further comprising:

dividing the plurality of power converters into the first group of power converters synchronized to the first synchronization signal, and the second group of power converters synchronized to a second synchronization signal.

20. The method of claim 19, wherein:

the first synchronization signal comprises a plurality of pulses, a center of each pulses is vertically aligned with centers of corresponding gate drive signals of the first group of power converters.

* * * * *